United States Patent [19]

Aoyagi et al.

[11] Patent Number: 5,982,999
[45] Date of Patent: Nov. 9, 1999

[54] POST CARD PRINTING SYSTEM, WHICH ORIENTS MULTIPLE IMAGES SYMMETRICALLY ABOUT A CENTRAL POINT

[75] Inventors: Masato Aoyagi; Tsutomu Shouji, both of Kanagawa; Osamu Nakamoto, Tokyo; Sadao Okada, Kanagawa; Ikuo Ohtomo, Tokyo; Hiromichi Okazaki, Saitama, all of Japan

[73] Assignee: Ricoh Company, Ltd., Tokyo, Japan

[21] Appl. No.: 08/933,142

[22] Filed: Sep. 18, 1997

[30] Foreign Application Priority Data

Sep. 18, 1996 [JP] Japan .................................. 8-246673
Sep. 2, 1997 [JP] Japan .................................. 9-237442

[51] Int. Cl.$^6$ ................................................. G06F 15/00
[52] U.S. Cl. ........................................... 395/117; 382/295
[58] Field of Search ........................... 395/101, 112–114, 395/117; 382/295

[56] References Cited

U.S. PATENT DOCUMENTS

| | | | |
|---|---|---|---|
| 5,249,060 | 9/1993 | Ishikawa et al. | 358/296 |
| 5,318,941 | 6/1994 | Ohshima et al. | 503/227 |
| 5,343,386 | 8/1994 | Barber | 364/400 |
| 5,530,790 | 6/1996 | Ueyama et al. | 395/102 |
| 5,571,587 | 11/1996 | Bishop et al. | 428/43 |
| 5,579,116 | 11/1996 | Sugiyama et al. | 358/296 |
| 5,649,031 | 7/1997 | Nakamura et al. | 382/254 |
| 5,719,953 | 2/1998 | Okabayashi et al. | 382/151 |
| 5,729,255 | 3/1998 | Aoki | 345/128 |

FOREIGN PATENT DOCUMENTS 0568357  11/1993  European Pat. Off.  ........  G06F 15/72

OTHER PUBLICATIONS

Fredrick, S., "Esprit de Corp found in graphic department", MacWeek, v6, n7, p. 38–39, Feb. 17, 1992.

"Color prepress issues and products.", Seybold Report on Desktop Publishing, v6, n3, p. 19–34, Nov. 1, 1991.

*Primary Examiner*—Amelia Au
*Assistant Examiner*—Martin E. Miller
*Attorney, Agent, or Firm*—Oblon, Spivak, McClelland, Maier & Neustadt, P.C.

[57] ABSTRACT

There are provided a copying machine executing the processing for reading image data from a document and the processing for printing the image data, a computer for editing image data read by the copying machine, and a memory board having a memory for storing therein image data to which an image data bus of the copying machine and an internal bus of the computer are connected respectively, and the copying machine executes the processing for reading image data from a document and writing the image data in a memory, the computer executes the processing for reading the image data from a memory, editing the image data, and writing the edited image data again in the memory, the copying machine executes the processing the reading the edited image data from the memory and printing the image data, and the memory board controls the operations for reading and writing the image data by the copying machine.

6 Claims, 19 Drawing Sheets

FIG.6

SETTING FOR SCANNING

RESOLUTION
- ● 400dpi
- ○ 200dpi

[ SCAN ]
[ END ]

DOCUMENT SIZE
- ● A3 FORM IN PORTRAIT ORIENTATION
- ○ B4 FORM IN PORTRAIT ORIENTATION
- ○ A4 FORM IN LANDSCAPE ORIENTATION
- ○ A4 FORM IN PORTRAIT ORIENTATION
- ○ B5 FORM IN LANDSCAPE ORIENTATION
- ○ B5 FORM IN PORTRAIT ORIENTATION
- ○ A5 FORM IN LANDSCAPE ORIENTATION
- ○ A5 FORM IN PORTRAIT ORIENTATION
- ○ B6 FORM IN LANDSCAPE ORIENTATION
- ○ B6 FORM IN PORTRAIT ORIENTATION
- ○ A6 FORM IN LANDSCAPE ORIENTATION (POST CARD)
- ○ A6 FORM IN PORTRAIT ORIENTATION (POST CARD)

REMOVAL OF MOIRE
- ● NOT REQUIRED
- ○ PATTERN 1 (3×3 FILTER)
- ○ PATTERN 2 (3×3 FILTER)
- ○ PATTERN 3 (RANDOM THINNING)

SHARPNESS FILTER
- ○ THROUGH
- ○ SMOOTHING 1
- ● SMOOTHING 2
- ○ SMOOTHING 3
- ○ MTF1
- ○ MTF2
- ○ MTF3

☐ FGATE IGNORED
☐ REVERSION

WIDTH  4680  dot
HEIGHT 6608  dot

FIG.7
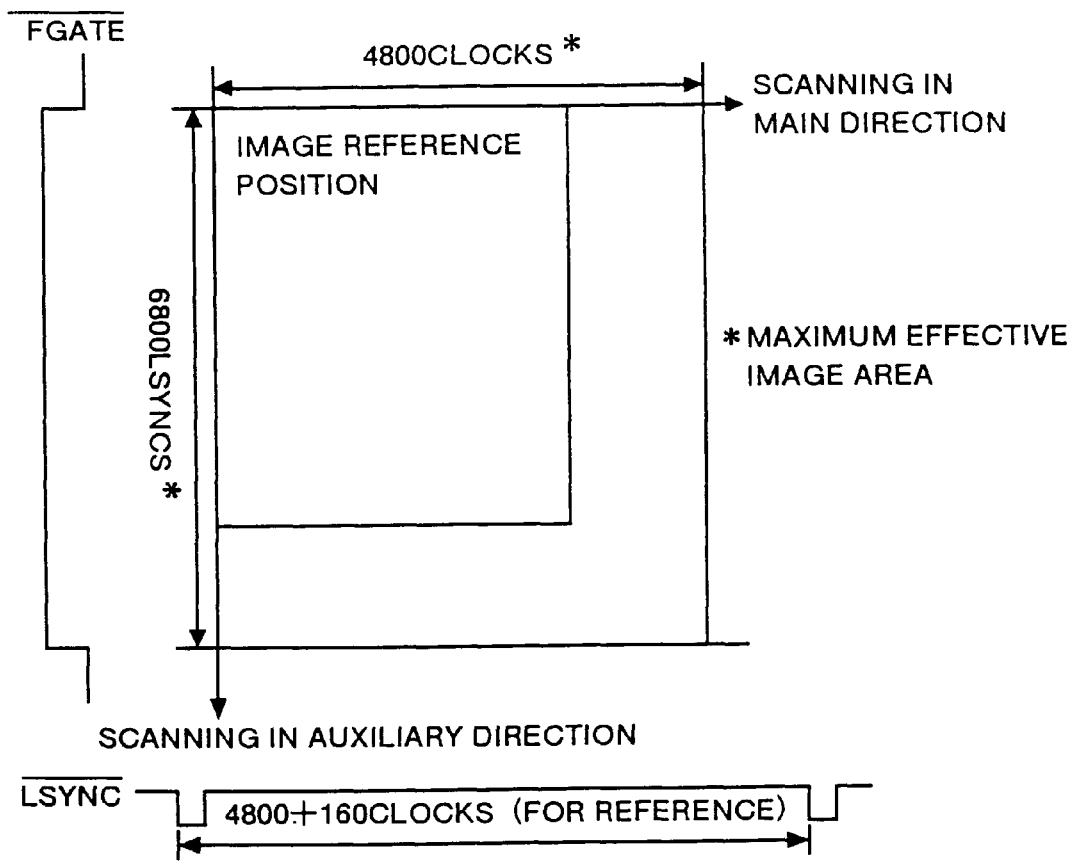
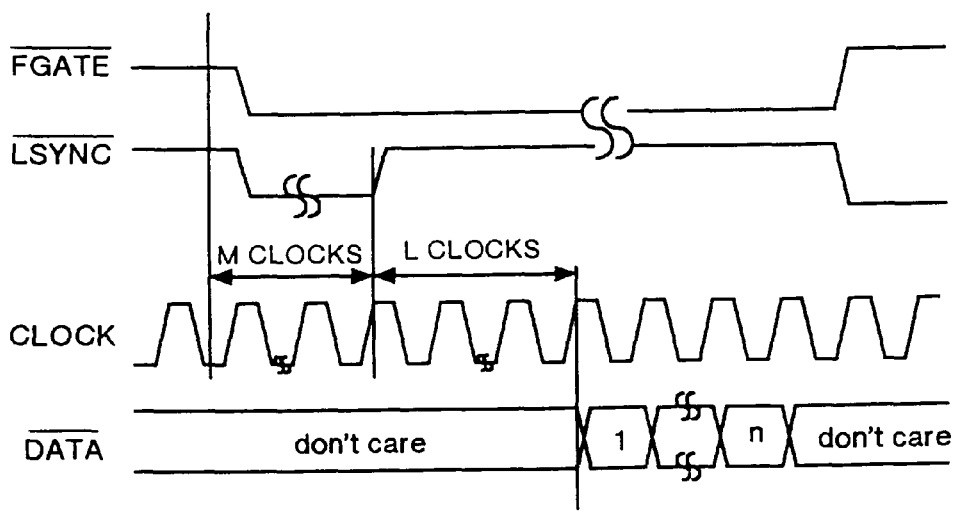

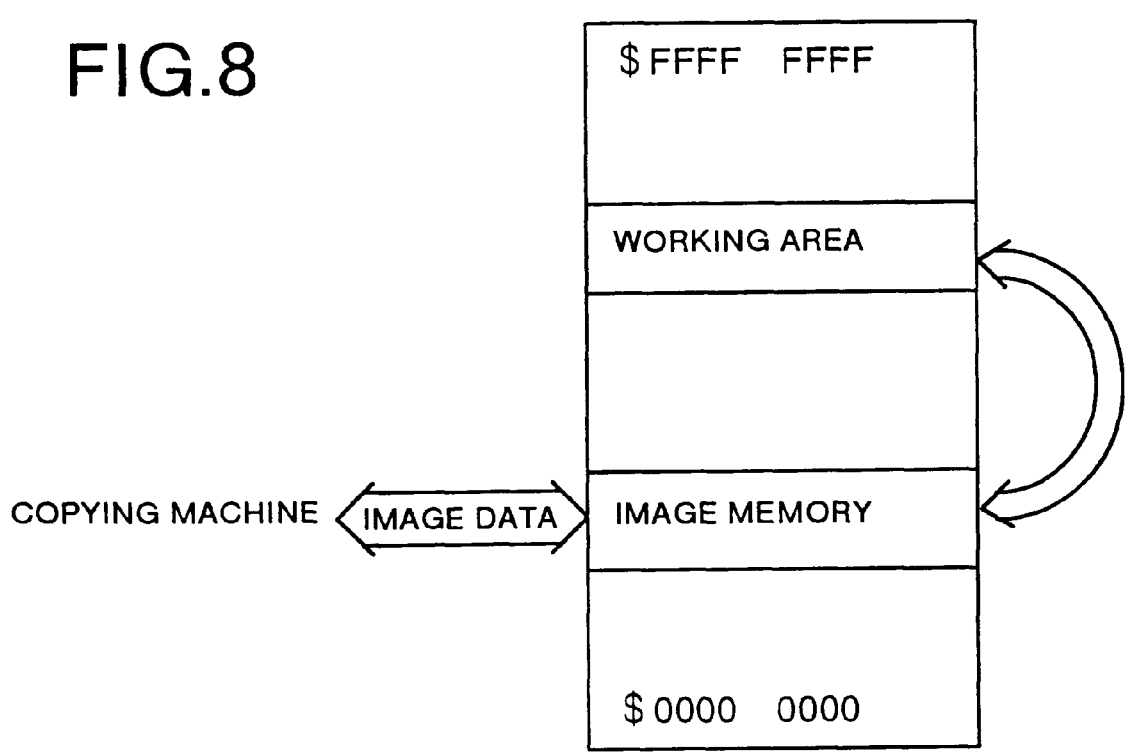

FIG.9

SETTING FOR PRINTING

PRINTING METHOD
- ● SIMULTANEOUS PRINTING OF 8 SHEETS OF POST CARD
- ○ SIMULTANEOUS PRINTING OF 4 SHEETS OF POST CARD
- ○ ORDINARY

PRINT MODE
- ● CHARACTER MODE
- ○ PICTURE MODE
- ○ CHARACTER/PICTURE MODE

[PRINTING]
[STOP]
[END]

DOCUMENT SIZE
- ● CASSETTE 1 → A4 FORM IN LANDSCAPE ORIENTATION
- ○ CASSETTE 2 → B4 FORM IN LANDSCAPE ORIENTATION
- ○ CASSETTE 3 → A3 FORM IN LANDSCAPE ORIENTATION
- ○ MANUAL FEEDING → NO CASSETTE

TYPE OF FORM
- ● ORDINARY PAPER
- ○ OHP
- ○ OTHERS

OUTPUT MODE
- ● FULL COLOR
- ○ TWO COLORS
- ○ NO COLOR

MESSAGE : OUTPUT PROVIDED IN CMYK FULL-COLOR MODE

[SETTING OF DETAILS FOR OUTPUT MODE]

SET: [1] SHEETS
COPY: SHEETS

FIG.14

| ENTRY ITEMS | RECOGNIZING METHOD | | SPECIFICATION OF COLOR | | | |
|---|---|---|---|---|---|---|
| | INPUT OF TEXT | TYPOGRAPHY | | | | |
| 1 TITLE OF EXHIBITION | INPUT<br>EXHIBITION OF PATENTS | AVAILABLE/TO BE CREATED | BK | Gay | M | C |
| 2 SUBTITLE | INPUT<br>MEMORIAL EXHIBITION OF 100 YEARS<br>ANNIVERSARY BIRTH OF TOKKYO TARO | AVAILABLE/TO BE CREATED | BK | Gay | M | C |
| 3 PATTERN | ☑A  ☐B  ☐C  ☐NONE | | | | | Fit |
| 4 DATE OF EXHIBITION | INPUT<br>1996 YEAR, [9](MONTH),[1](DAY) ☐(DAY OF A WEEK) ~[9](MONTH), [22](DAY)☐(DAY OF A WEEK) | — | BK | Gay | M | C |
| 5 TIME OF EXHIBITION | INPUT<br>[1][1]:[0][0]am~[5]:[0][0]pm | — | BK | Gay | M | C |
| 6 COMMENTS ON TIME NONE AVAILABLE | ☐NONE<br>UNTIL [4] O'CLOCK ON THE FINAL DAY. | ☑PRESENT | BK | Gay | M | C |
| 7 NAME OF PLACE | INPUT<br>PATENT HALL | AVAILABLE/TO BE CREATED | BK | Gay | M | C |
| 8 ADDRESS OF PLACE FOR EXHIBITION | INPUT<br>5-5-5, KASUMIGASEKI,CHIYODA-KU,TOKYO<br>PATENT CENTER BLDG. 2F | AVAILABLE/TO BE CREATED | BK | Gay | M | C |
| 9 TELEPHONE NUMBER OF PLACE FOR EXHIBITION | INPUT<br>03-1234-1234 | AVAILABLE/TO BE CREATED | BK | Gay | M | C |
| 10 MAP OF PLACE FOR EXHIBITION | —<br>NAME | AVAILABLE/TO BE CREATED | BK | Gay | M | C |
| 11 PERSONAL MESSAGE | ☐NONE  ☐YES<br>I'LL BE AT THE PLACE FOR EXHIBITION ON ☐. | | | | | |
| 12 TITLE OF ART WORK | | | | | | |
| 13 SIZE | | | | | | |
| 14 NAME OF ARTIST | | | | | | |

5,982,999

POST CARD PRINTING SYSTEM, WHICH ORIENTS MULTIPLE IMAGES SYMMETRICALLY ABOUT A CENTRAL POINT

FIELD OF THE INVENTION

The present invention relates to an image processing system using a computer and a copying machine, and more specifically to an image processing system which enables high speed transfer of image data between a computer and a copying machine as well as high quality image processing, and further to a post card printing system, an image processing method, a post card printing method, and a computer-readable recording medium with a program making a computer execute each step of the methods.

BACKGROUND OF THE INVENTION

To build an image processing system by connecting a digital color copying machine (described as "copying machine" hereinafter) to a computer such as a personal computer or a workstation and also by using the copying machine as a scanner or a printer, it is necessary to connect a dedicated printer controller to a section between the computer and the copying machine. The configuration is employed because a copying machine is ordinarily designed to execute real time operations for reading and forming an image without storing the read image data once in a memory to read out the stored image data for forming the image later and is not adapted to transfer full-color image data requiring a large data volume to a computer.

For this reason, a printer controller has a configuration suited for connection with a copying machine, and has a CPU, a ROM, a RAM, a HD, an IC for communications or the like each adapted to the configuration, and further has an image memory for temporally storing image data read by a copying machine or image data to be printed by a copying machine. And the printer controller is connected to a copying machine via an image data bus of the copying machine and also connected to a computer via a general purpose communication line (such as SCSI).

The printer controller receives image data read with a copying machine and stores the image data once in an image memory, and can transfer the image data with communication via the general purpose communication line with a computer. The printer controller executes other types of processings, when PostScript data is received from a computer, such as converting the PostScript data to bit map data and inputting the data into a copying machine.

As described above, availability for various purposes is realized in connection with a copying machine by using a printer controller, whereby any type of computer can be connected to a copying machine. Further, it is possible to build a network by connecting a plurality of computer units via a printer controller to a copying machine.

By the way, when executing the processing of printing data for post card printing prepared by a computer on both surfaces of a post card form with a copying machine, a thickness of a post card form is larger than that of recording paper used by a copying machine or the like, so that it is impossible to print the data on both surfaces of the form with a double-side printing function of a copying machine due to construction of a transfer mechanism in the copying machine. For this reason, it is required to manually feed forms when data is to be printed on both surfaces of a form.

Namely, when printing data on both surfaces of a post card form, employed is a method in which previously prepared top surface data for a post card and rear surface data for a post card are inputted, the top surface data for a post card is printed on one surface of a post card manually fed, and then the post card form is turned over and again manually fed to print the rear surface data for a post card on another side thereof.

However, although the printer controller can provide wide range adaptability in connection between a computer and a copying machine, as the printer controller and a computer are connected with a general purpose line such as SCSI, for instance, in a case where full-color image data read from a document having A3 size with the resolution of 400 dpi is transferred to a computer, at least several tens of minutes is required to transfer the image data, which means that the transfer rate is disadvantageously low.

As a result, as it is not realistic to read image data at the high resolution of, for instance, 4000 dpi, generally image data is read at the low resolution of 200 dpi or below and transferred to a computer, so that it has been impossible to obtained high quality image data. Namely, a higher transfer rate can be realized only at the sacrifice of image quality. In addition, when image data is read at a low resolution, a data rate becomes smaller, which makes it impossible to remove moire generated when a printed matter is read, resulting in further degradation of image quality.

Also when outputting image data from a computer to a copying machine, it is difficult to print high quality images at a high speed.

In addition, to make it possible for a print controller to receive image data from or output image data to any type of copying machine, the print controller itself requires such components as a CPU, a ROM, a RAM, a HD, an IC for communication, an image memory, and for this reason the printer controller is disadvantageously expensive.

Further, in addition to the difficulty of printing high quality images at a high speed, when data for a post card is to be printed on both surfaces of a post card form with a copying machine, it is necessary to execute printing on both surfaces of a post card form manually feeding the form, and after the data is printed on one surface of the post card form, when the post card form is turned over and again manually fed to print data on another side thereof, it is required to ascertain a direction of form feeding so that the printing direction on one side is identical to that on the other side of the post card form. Especially, in a case where data for a plurality of sheets of post cards is to be printed on a post card form having the size equivalent to a plurality sheets of post cards, if an operator forgets to check the direction in which the post card form is fed, data printed on a top surface of the post card form mismatches that printed on a rear surface of the form, which makes the printing work very complicated and troublesome.

SUMMARY OF THE INVENTION

It is an object of the present invention to make it possible to connect a copying machine to a computer without using a printer controller nor any general purpose communication line, and to realize a high speed image data transfer.

It is a second object of the present invention to make it possible to read and print high quality image data by realizing a high speed image data transfer.

It is a third object of the present invention to make it possible to remove moire generated when a printed matter is read as well as to obtain higher quality image data by realizing a high speed image data transfer even when image data is read at a high resolution.

It is a fourth object of the present invention to reduce cost of an image processing system as a whole by eliminating the necessity for a printer controller and building the image processing system with existing facilities including a copying machine and a computer.

It is a fifth object to eliminate the necessity of checking a direction in which a post card form is fed, even when data is printed on both sides of the form manually feeding the form.

It is a sixth object of the present invention to prepare data for a post card to be printed on a post card form quite easily.

The image processing system according to the present invention comprises a reader for simultaneously reading image data for three colors of R, G, and B from a document to be read; an editor for editing the image data read by the reader; a printer for printing the image data edited by the editor; and a storage device having a memory for storing therein the image data, to which internal buses of the reader, editor and printer are connected respectively via the memory so that the image data can be transferred via the memory; and in the image processing system the reader executes the processing for reading image data for three colors of R, G, and B from the document and simultaneously writing the read image data for three colors of R, G, and B in discrete regions for the three colors respectively in the memory; the editor executes the processing for reading out image data written by the reader from the memory, editing the image data, and writing the edited image data in the memory again; the printer executes the processing for reading out the image data written by the editor from the memory and printing the image data; and the storage device controls the processing for writing the image data by the reader and the processing for reading out the image data by the printer, so that image data can be transferred at a high speed. Further image data for three colors of R, G, and B can simultaneously be read and written in the memory, so that image data can be transferred at a further higher speed. In addition, as image data can be transferred at a high speed, it becomes possible to read and print high quality image data. Namely, it is not necessary to execute image data transfer via a general purpose communication line with a printer controller, so that image data can be transferred at a high speed.

With the post card printing system according to the present invention for preparing top surface data for a post card as well as rear surface data for the post card, printing the top surface data for a post card on one surface of a post card fed thereto and also printing the rear surface data for the post card on the other surface of the fed post card by using the image processing system according to the present invention, and in the post card printing system the post card has a size in which an even number of post cards are arrayed; the editor prepares top surface data for the post card as well as rear surface data for the post card, writes the prepared top surface data for the post card in a memory of the storage device and copies the data by a plurality of sheets, locates the copied data at symmetrical positions around a central point of the post card form, also writes the prepared rear surface data for the post cards in the memory and copies the data by a plurality of sheets, and locates the copied data at symmetrical positions around a central position of the post card; the printer reads out the top surface data for the post card copied by the editor from the memory, prints the top surface data for the post card on one surface of the fed post card, reads out the rear surface data for the post card copied by the editor from the memory, and prints the rear surface data of the post card on another surface of the fed post card again, so that, in addition to the effects provided by the image processing system, there is provided the effect that the necessity for checking feeding direction of a post card from for coincidence of printing directions on both top and rear surfaces of the form can be eliminated. Namely, when data for a rear surface of a post card is to be printed on a post card form with data for a top surface thereof printed thereon, even if the post card form is fed without checking the printing direction, a printing direction and a printing position on the top surface of the post card matches those on a rear surface thereof. Also as a plurality sheets of post card can simultaneously be printed, the printing efficiency is improved, and a unit cost for a sheet of post card can be reduced.

With the image processing method according to the present invention in an image processing system comprising a reader for simultaneously reading image data for three colors of R, G, and B from a document to be read; an editor for editing the image data read by the reader; a printer for printing the image data edited by the editor; and a storage device having a memory to which internal buses of the reader, editor and printer are connected respectively via the memory so that the image data can be transferred via the memory; the image processing method comprises a reading step of reading image data for three colors of R, G, and B from the document with the reader and also simultaneously writing the read image data for each of the three colors of R, G, and B in the discrete areas for the three colors respectively in the memory; an editing step of reading the image data written in the reading step from the memory, editing the image data with the editor, and writing the edited image data again in the memory; and a printing step of reading the image data written in the editing step from the memory and printing the image data with the printer, so that image data can be transferred at a high speed. Further, image data for three colors of R, G, and B are simultaneously read and written in a memory, so that image data can be transferred at a further higher speed. Furthermore, as image data can be transferred at a higher speed, it becomes possible to read and print high quality image data. Namely, it is not necessary to transfer image data via a general purpose communication line between the image processing system and a printer controller, further higher speed in image data transfer can be realized.

With the post card printing method according to the present invention, there is provided a post card printing method comprising the steps of preparing top surface data as well as rear surface data for a post card, printing the top surface data for a post card on one surface of a post card form, turning over the post card form, and printing the rear surface data for the post card on another surface of the post card manually fed thereto again by using the image processing method according to the present invention; and in this post card printing method the post card has a size in which an even number of post cards are arrayed; said method comprises a post card top surface data generating step of, by means of the editing step, preparing the top surface data for a post card, copying the prepared top surface data for the post card by a plurality of sheets by writing the prepared top surface data for the post card into a memory of the storage device, and also locating the copies symmetrically around a central point of the post card form; a post card top surface data printing step of, by means of the printing step, reading out the top surface data for a post card copied in the post card top surface data generating step from the memory and printing the top surface data for the post card on one surface of the post card form manually fed thereto; a post card rear surface data generating step, by means of the editing step, of preparing rear surface data for the post card, copying the prepared rear surface data by a plurality of sheets by writing the prepared rear surface data for the post card into the memory, and locating the copies symmetrically around a central point of the post card form; and a post card rear surface data printing step of, by means of the printing step, reading out the rear surface data for the post card copied in the post card rear surface generating step from the memory and printing the rear surface data for the post card on another surface of the post card form manually fed thereto again, so that, in addition to the effects provided by the image processing method described above, even in a case where printing is executed manually feeding paper, there is provided the effect that it is not necessary to check a post card form feeding direction so that a printing direction on a top surface thereof matches that on a rear surface thereof. Namely, when rear surface data for a post card is printed on a post card form with top surface data for it having been printed on the top surface, even if a post card form is fed without checking the printing direction, a printing direction and a printing position on the top surface of the post card matches those on the rear surface thereof. Also a plurality sheets of post card can simultaneously be printed, so that the printing efficiency can be improved with a unit cost for a sheet of post card reduced.

Other objects and features of this invention will become understood from the following description with reference to the accompanying drawings.

BRIEF DESCRIPTION OF THE DRAWINGS

FIG. 6 is an explanatory view showing a setting screen when image data is read in the image processing system according to the embodiment of the present invention;

FIG. 7 is a timing chart for the processing of reading an image in the image processing system according to the embodiment of the present invention;

FIG. 8 is an explanatory view for explaining the processing for reading RGB data from the image memory by the computer in the image processing system according to the embodiment of the present invention;

FIG. 9 is an explanatory view showing a setting screen when the data is printed in the image processing system according to the embodiment of the present invention;

FIG. 10A is a timing chart for a case where the image data is read out by a unit of 32 bits; and FIG. 10B is a timing chart for a case where the image data is read out by a unit of 8 bits;

FIG. 14 is an explanatory view showing one example of a setting screen for preparation of top surface data for a post card in the post card printing system using the image processing system according to the embodiment of the present invention;

DESCRIPTION OF THE PREFERRED EMBODIMENTS

Detailed description is made hereinafter for one embodiment of an image processing system, a post card printing system, an image processing method, a post card printing method, and a computer-readable recording medium with a program making a computer execute each step of the methods stored therein each according to the present invention with reference to the attached drawings.

Figure 1:
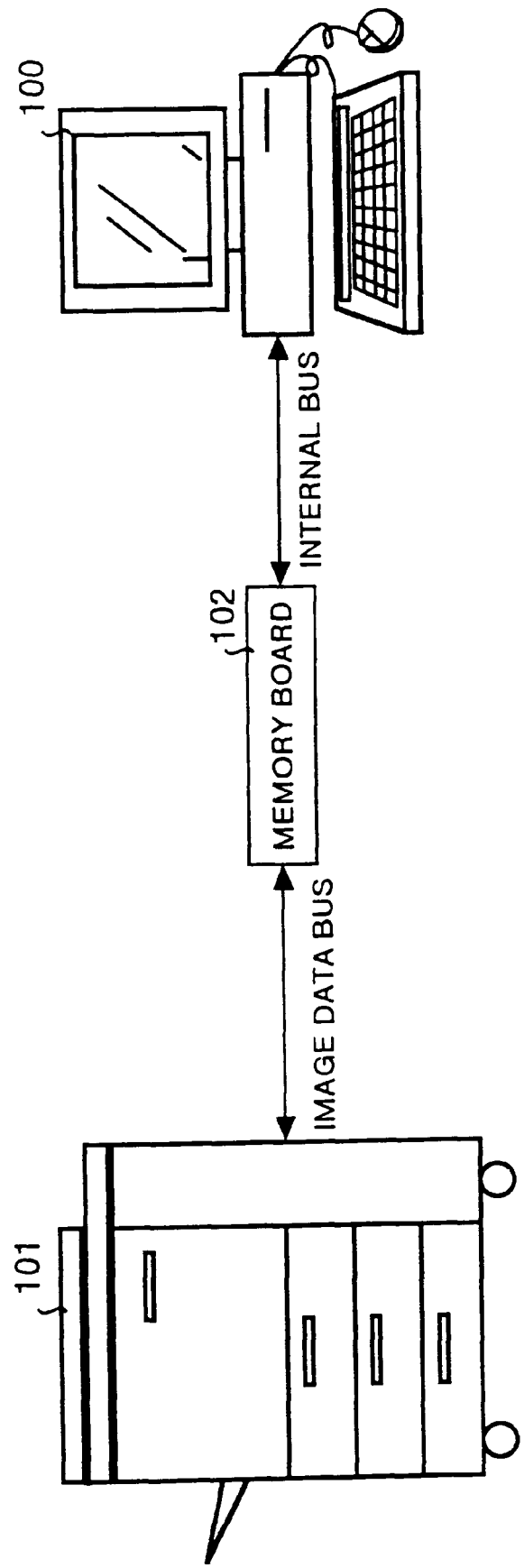
FIG. 1 is a view showing configuration of an image processing system according to an embodiment of the present invention.

FIG. 1 is a view showing a configuration of an image processing system according to an embodiment of the present invention. The image processing system comprises a personal computer 100 (described as "computer 100" hereinafter) for editing image data, a digital color copying machine 101 (described as "copying machine 101" hereinafter) for reading image data to be edited by the computer 100 from a document as an object for reading and also printing the image data after the editing, and an image memory (Refer to FIG. 4), and also has a memory board 102 with an internal bus of the computer 100 and an image data bus of the copying machine 101 connected thereto respectively.

It should be noted that the memory board 102 may be provided independently, as shown in FIG. 1, between the computer 100 and the copying machine 101, or may be provided inside either the computer 100 or the copying machine 101. In the present embodiment, as described later, it is assumed that the memory board 102 is provided inside the computer 100. Also the internal bus of the computer 100 and the image data bus of the copying machine 101 are so designed as to enable transmission of image data by 32 bits at the maximum respectively.

Figure 2:
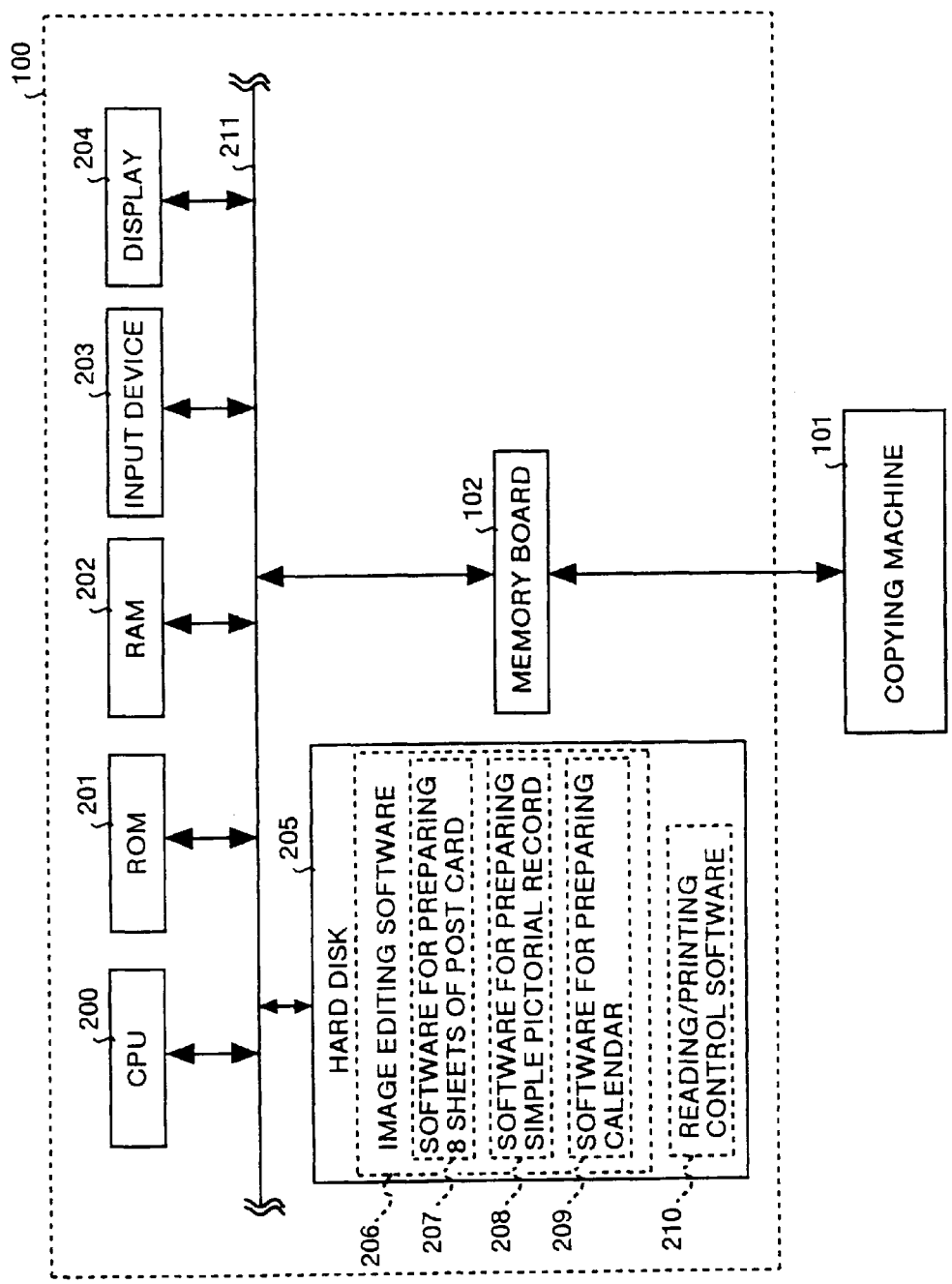
FIG. 2 is a block diagram showing configuration of the computer shown in FIG. 1.

FIG. 2 is a block diagram showing a configuration of the computer 100 shown in FIG. 1. In FIG. 2, designated at the reference numeral 200 is a CPU, at 201 a ROM, at 202 a RAM, at 203 an input device comprising a keyboard and a mouse or the like, at 204 a display such as a CRT and a liquid crystal display, at 205 a hard disk with various application programs stored therein, and at 211 a bus for connecting the components to each other therethrough respectively. It is to be noted that the memory board 102 shown in FIG. 1 is provided inside the computer 100 shown in FIG. 2 and is connected to the bus 211.

The hard disk 205 includes image editing software 206 (software 207 for preparing eight sheets of post cards on a form, software 208 for preparing a simple pictorial record, and software 209 for preparing a calendar) for editing image data read by the copying machine 101 and reading/printing control software 210 for controlling the processing of reading and printing image data by the copying machine 101. It should be noted that the image editing software 206 (software 207 for preparing eight sheets of post cards on a form, software 208 for preparing a simple pictorial record, and software 209 for preparing a calendar) and the reading/printing control software 210 are described in detail later.

Figure 3:
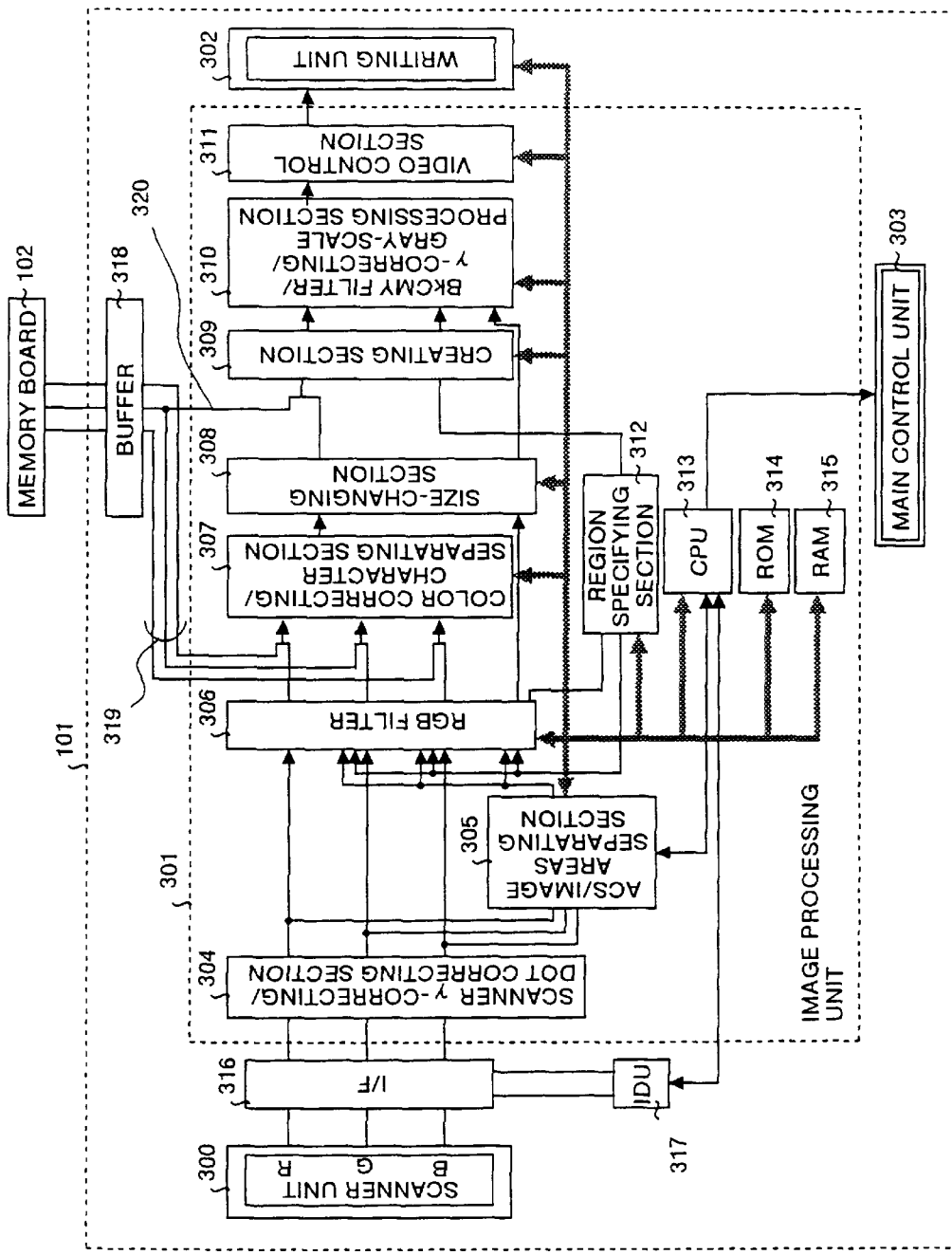
FIG. 3 is a block diagram showing configuration of the copying machine shown in FIG. 1.

FIG. 3 is a block diagram showing a configuration of the copying machine 101 shown in FIG. 1. The copying machine 101 comprises a scanner unit 300 for reading image data for three colors of R (red), G (green), and B (blue) (described as "RGB data" hereinafter) from a document; an image processing unit 301 for receiving RGB data read by the scanner unit 300 through an I/F (interface) 316, subjecting the received RGB data to specified image processing, and color-converting the data to image data for four colors of Bk (black), C (cyan), M (magenta), and Y (yellow); a writing unit 302 for receiving BkCMY data from the image processing unit 301 and printing the image data onto recording paper; and a main control unit 303 for controlling each of the components. Herein, it is assumed that the scanner unit 300 can read RGB data from a document, for example, at resolution of 400 dpi and can simultaneously read image data for three colors of R, G, and B. It is needless to say that any device which discretely reads each of R, G, and B in the image data for three colors of R, G, and B may be used.

It should be noted that, in the image processing unit 301, designated at the reference numeral 304 is a scanner γ-correcting/dot correcting section for executing γ-correction according to optical characteristic of the scanner unit 300, at 305 an ACS/image areas separating section for determining whether a document is a monochrome document or a color document, deciding whether the processing of printing is to be executed in the monochrome mode or the color mode, and also separating a character area from a picture area, at 306 a RGB filter for subjecting RGB data to smoothing and moire-removing processing, at 307 a color correcting/character separating section for converting RGB data to BkCMY data and also separating a character area from the RGB data, at 308 a size-changing section for performing the processing of enlarging and reducing, at 312 a region specifying section for specifying a region to be processed, at 309 a creating section for subjecting the region specified by the region specifying section to a specified processing, at 310 a BkCMY filter/γ-correcting/gray-scale processing section for executing γ-correction, quantization such as a dither processing and an error diffusion processing, and a smoothing processing as well as a sharpening processing according to frequency characteristics of the writing unit 302, at 311 a video control section for outputting the BkCMY data subjected to the various types of image processing to the writing unit 302, at 313 a CPU, at 314 a ROM, at 315 a RAM, and at 317 an IDU for recognizing any bill.

In the embodiment, RGB signal lines 319 and a BkCMY signal line 320 (image data bus shown in FIG. 1) are connected to the memory board 102 via a buffer 318 so that image data can directly be read out from or written into the image memory of the memory board 102 from the copying machine 101.

The RGB signal lines 319 are used in a case where RGB data read out by the scanner unit 300 is written into the memory board 102 as well as in a case where image data with the three colors of RGB left therein as they are is edited in the computer 100 and the RGB data is read out from the memory board 102. On the other hand, the BkCMY signal line 320 is used in a case where the RGB data is converted to the BkCMY data in the computer 100 and in a case where the BkCMY data is read out from the memory board 102. Which of the signal lines is to be used can freely be set or changed.

Figure 4:
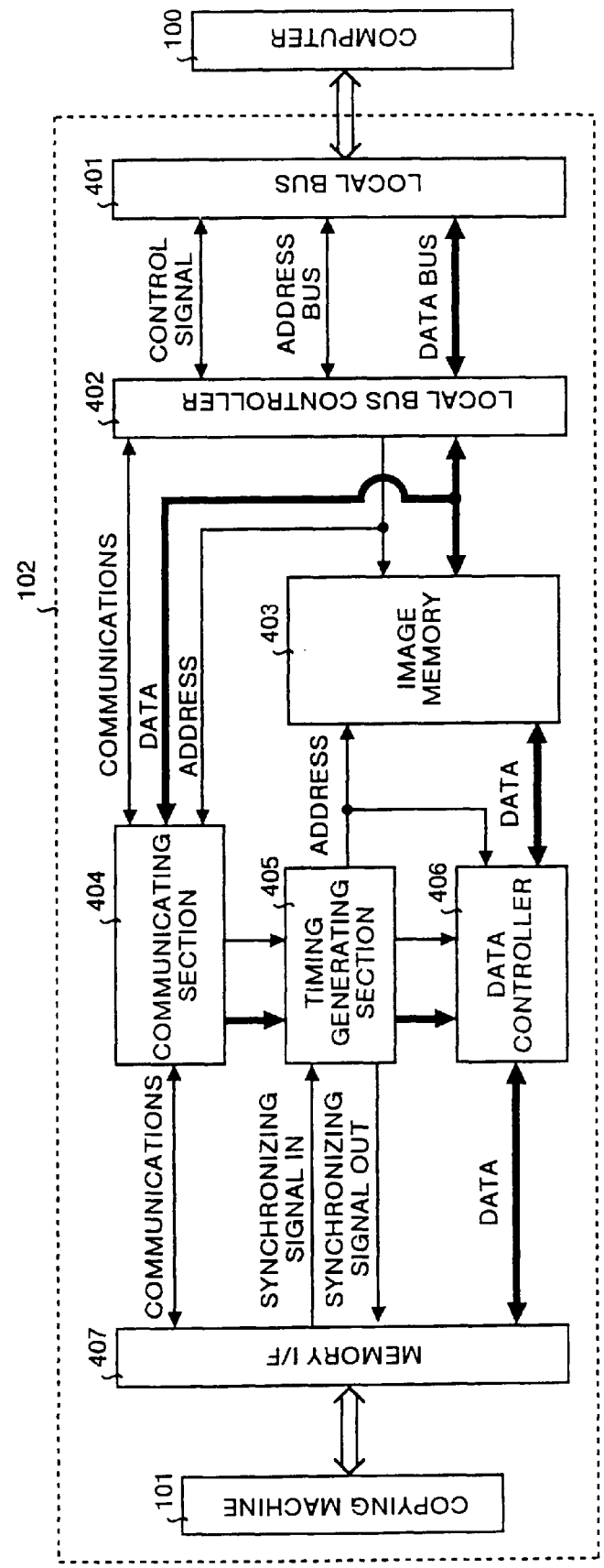
FIG. 4 is a block diagram showing configuration of the memory board shown in FIG. 1.

FIG. 4 is a block diagram showing a configuration of the memory board 102 shown in FIG. 1. The memory board 102 shown in FIG. 4 comprises a local bus I/F 401 for connection to the bus 211 of the computer 100 shown in FIG. 2; a local bus controller 402 for receiving a control signal, an address signal, and image data via the local bus I/F 401 and controlling operations for reading the image data from the image memory 403 to the computer 100 and writing the image data from the computer 100 into the image memory 403; a communicating section 404 for receiving the control signal, address signal, and image data from the local bus controller 402 and executing communications with the copying machine 101 via a memory I/F 407; a timing generating section 405 for receiving the address signal and image data from the computer, and a synchronizing signal comprising a vertical synchronizing signal, horizontal synchronizing signal, and a clock signal from the copying machine 101 via the memory I/F 407 and generating a timing signal when the image data read by the copying machine 101 is written into the image memory 403 and when the copying machine 101 reads out image data therefrom; and a data controller 406 for receiving a control signal, an address signal, and the timing signal from the timing generating section 405, and controlling the processing for writing image data read by the copying machine 101 into the image memory 403 and processing for reading the image data from the image memory 403 to the copying machine 101. It should be noted that the image memory 403 is assumed to have a capacity of 128 M bytes and enable an operation for writing data by 32 bits at the maximum so that image data obtained by reading an A3-size full-color document at 400 dpi can be stored therein.

Next detailed description is made for operations of the image processing system (image processing method) having the configuration as described above. It is assumed that RGB data is color-converted to BkCMY data by means of using the image editing software 206 for the computer 100. Namely, in the computer 100, image data at the time of input is RGB data, while image data at the time of output is BkCMY data.

Figure 5:
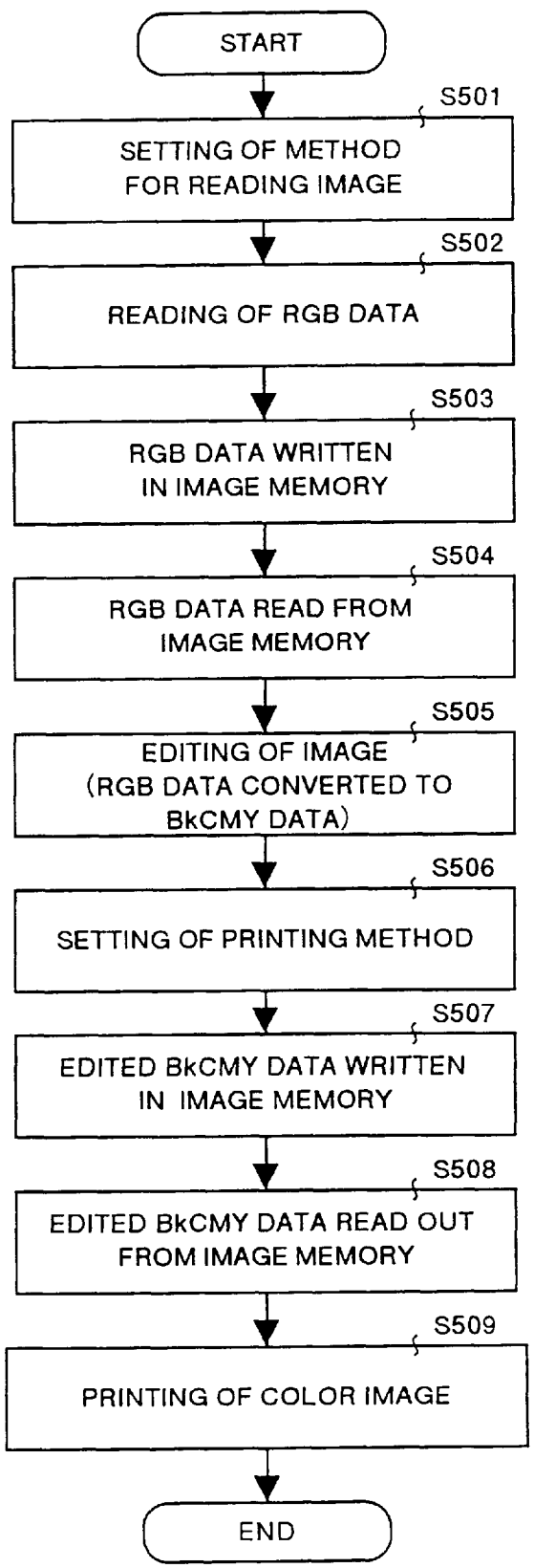
FIG. 5 is a flowchart schematically showing processing from a step of reading image data from a document to a step of printing the data in the image processing system according to the embodiment of the present invention.

FIG. 5 is a flowchart showing the processing from a step of reading out RGB data from a document to a step of printing the data.

At first, in the computer 100, a method of reading an image is set by operating the reading/printing control software 210 (S501).

FIG. 6 is an explanatory view showing a setting screen when an image is to be read out. The processing for reading RGB data from a document is performed by controlling the copying machine 101 using the reading/printing control software 210 of the computer 100. The setting screen shown in FIG. 6 is displayed on the display 204 of the computer 100, on which resolution, a document size, whether the moire removing processing is to be performed or not, and whether the smoothing processing is to be performed or not (sharpness filter) or the like can be specified through the input device 203. Also, in the setting screen shown in FIG. 6, a range in which a document is to be read by the copying machine 101 can be specified, although it is not shown in the figure.

Then the processing for reading RGB data can be performed in the copying machine 101 by selecting the "scan" button shown in FIG. 6 (S502). It is assumed herein that 8 bits are allocated to one pixel in image data for each of colors of R, G, and B, and the three types of data for the colors of R, G, and B are simultaneously read out.

FIG. 7 is a timing chart illustrating the processing for reading RGB data. In FIG. 7, a $\overline{\text{LSYNC}}$ bar is a horizontal synchronizing signal showing a maximum available image area from an image reference position in a main scanning direction, and a $\overline{\text{FGATE}}$ bar is a vertical synchronizing signal showing a maximum available image area from the image reference position (a read-starting position) in an auxiliary scanning direction, in which RGB data is read out from a document using a clock signal as a reference.

It should be noted that in step S501, when the processing for reading a range required for a document is specified, a read-starting position in the auxiliary scanning direction can be changed by delaying a timing for reading the document by M clocks shown in FIG. 7, and a read-starting position in the main scanning direction can be changed by delaying the timing by L clocks. As a result, the RGB data with the range required for the document having been read can be obtained, which allows an amount of data for RGB data to be reduced with the subsequent processing executed at a higher processing speed.

The copying machine 101 performs, in step S501, when execution of the moire removing processing and of smoothing processing is specified, the moire removing and the smoothing processing to the data using the RGB filter 306 shown in FIG. 3.

Then, the copying machine 101 inputs the RGB data into the memory board 102 in synchronism to the synchronizing signal shown in FIG. 7, and performs the processing of writing the read RGB data into the image memory 403 (S503). The copying machine 101 inputs 8-bit image data for three colors of R, G, and B simultaneously (a unit of 24 bits) into the memory board 102, and writes the data into the image memory 403. It is to be noted that the copying machine 101 may inputs image data by 8 bits into the memory board 102 for each of the colors of R, G, and B, and write the data into the image memory 403.

In the memory board 102, when the instruction of reading an image is issued in step S501 (the "scan" button shown in FIG. 6 is selected), an address for writing the RGB data read by the copying machine 101 into the image memory 403 is set. Namely, the reading/printing control software 210 of the computer 100 decides an X-address (in the horizontal direction) as well as a Y-address (in the vertical direction) in the image memory 403 so that the RGB data corresponding to the resolution and the document size set on the setting screen shown in FIG. 6 is written therein.

It should be noted that a discrete address is set herein for each image data for three colors of R, G, and B so that the image data for each of the three colors of R, G, and B is written into a discrete area in the image memory 403 respectively. Accordingly, the image memory 403 is practically partitioned into three areas into which image data for three colors of R, G, and B is discretely written for each of the colors.

The timing generating section 405 in the memory board 102 generates, when having received a synchronizing signal from the copying machine 101, a timing signal for writing RGB data into the image memory 403 according to the set address. Also, the data controller 406 receives the RGB data from the copying machine 101 and controls the processing for writing the RGB data in the memory by the copying machine 101 according to the timing signal generated in the timing generating section 405. As a result, the RGB data read by the copying machine 101 is written simultaneously with the three colors thereof into each address set for each image data for R, G, and B by the reading/printing control software 210 in the computer 100.

When the RGB data is written into the image memory 403 from the copying machine 101, the computer 100 performs the processing for reading RGB data from the corresponding address in the image memory 403 using the image editing software 206 (S504). The computer 100 may simultaneously read out each of the image data for three colors of R, G, and B, or may discretely read out each of the image data for three colors thereof.

As the RGB data in the image memory 403 has been written therein according to the address set by the reading/printing control software 210, the computer 100 can read out the RGB data from the image memory 403 in the same order as that of the RGB data read out by the copying machine 101 by reading out the RGB data according to the set address. In other words, the computer 100 and the copying machine 101 write and read out the RGB data in/from the memory using the common address, so that the correct RGB data can be obtained without an array of the RGB data being different from each other.

FIG. 8 is an explanatory view for explaining the processing of reading out RGB data from the image memory 403, and shows an address space (32-bit physical address space) viewed from the CPU 200 of the computer 100. As shown in FIG. 8, viewing from the CPU 200 of the computer 100, it is clear that the processing for reading out RGB data from the image memory 403 is merely to develop the RGB data in the working area of the image editing software 206 within the same address space. More concretely, the RGB data is only moved to the working area of the RAM 202 via the bus 211 (Refer to FIG. 2). As described above, the memory board 102 is directly connected to the internal bus of the computer 100 as well as to the image data bus of the copying machine 101, which allows higher transfer speed of RGB data between the copying machine 101 and the computer 100 to be achieved.

Then, the computer 100 reads out RGB data from the image memory 403 and performs editing of the image using the image editing software 206 (S505). In this case, the RGB data is color-converted to BkCMY data by the image editing software 206.

When the editing work in step S505 ends, a printing method is set by operating the reading/printing control software 210 (S506).

FIG. 9 is an explanatory view sowing a setting screen when printing is to be carried out. As shown in FIG. 9, a printing method, a print mode, an output form, an output mode or the like can be set thereon.

The print mode is used for setting any of a character mode, a picture mode, and a character/picture mode in which the printing processing is to be performed. The character mode is used for clearly printing a character with the outline thereof emphasized, the picture mode is used for finely printing a picture with the weight placed on the gray scale, and in the character/picture mode, the character mode is used for a character, and the picture mode is used for a picture, although the detailed description of operations in each mode is omitted herein. It should be noted that the character/picture mode includes a first mode in which an edge of the RGB data is detected by the copying machine 101 (color correcting/character separating section 307), the character area is separated from the data, the character mode is used for the data in the character area separated as described above, and the picture mode is used for the data in other areas; and a second mode in which the character mode or the picture mode can be specified to be used for each color of Bk, C, M, and Y. In the present embodiment, the image is processed with BkCMY data, so when the character/picture mode is specified, the second mode is used. It should be noted that, when the data is converted to BkCMY data by the computer 100, if the processing for separating the character area from the data can be performed by the copying machine 101, the first mode can be used.

Then, when the setting for printing ends and the "print" button shown in FIG. 9 is selected, the processing for writing the BkCMY data after having been subjected to the editing processing into the image memory 403 is executed by the reading/printing control software 210 of the computer 100 (S507). To be described concretely, an address for writing the data based on the edited BkCMY data into the image memory 403 is set, and the BkCMY data is written into the set address. When the BkCMY data is to be written into the image memory 403, each of the image data for Bk, C, M, and Y is discretely written in each address.

Then, the copying machine 101 performs the processing for reading out the BkCMY data written into the image memory 403 (S508).

The copying machine 101 generates, when execution of the printing is specified from the computer 100 (the "print" button in FIG. 9 is selected), a synchronizing signal comprising a vertical synchronizing signal, a horizontal synchronizing signal, and a clock signal, and executes the processing for reading out the image data from the memory in synchronism with the generated synchronizing signal. At that time, the timing generating section 405 in the memory board 102 receives the synchronizing signal from the copying machine 101, generates a timing signal so that the BkCMY data for the corresponding address can be read out in synchronism with the received synchronizing signal, and controls the processing of reading the BkCMY data performed by the copying machine 101 according to the timing signal generated by the timing generating section 405.

Figure 10A:
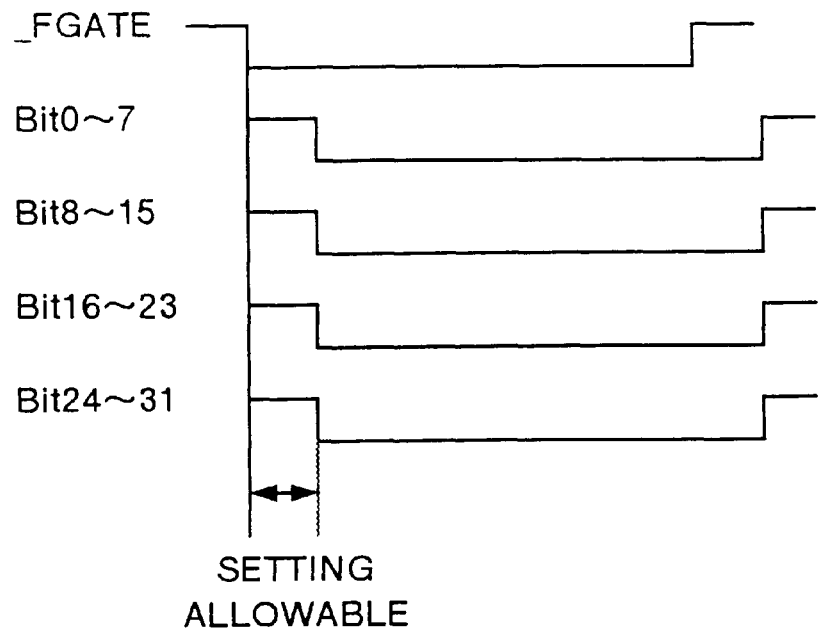
FIGS. 10A and 10B are timing charts for the processing of reading image data from the image memory by the copying machine in the image processing system according to the embodiment of the present invention.
Figure 10B:
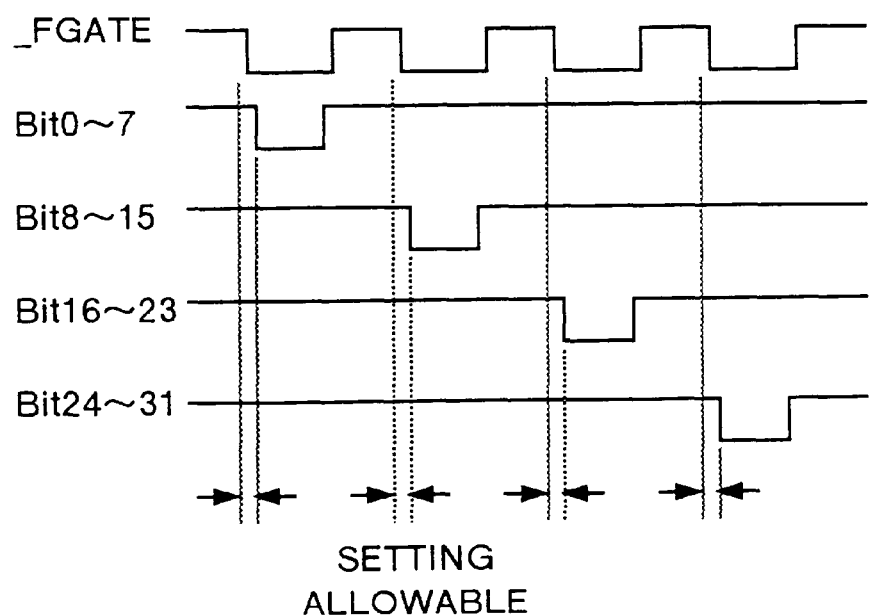

The copying machine 101 may use 8 bits, when the BkCMY data is to be read out, for each of the image data of Bk, C, M, and Y to be simultaneously read out (32 bits: Refer to FIG. 10A), or may discretely read out each of the image data for Bk, C, M, and Y with 8 bits each (Refer to FIG. 10B).

It should be noted that, when the method of printing is set, a position for printing the image on recording paper can be specified although it is not shown in FIG. 9. In this case, the timing generating section 405 in the memory board 102 controls the timing for reading out the BkCMY data from the image memory 403 according to the specified printing position, whereby the image is printed at the specified position by the copying machine 101 (Refer to FIG. 7, FIG. 10A and FIG. 10B).

In the reading/printing control software 210, the timing (delay time) for outputting the image data for Bk, C, M, and Y can previously be set according to the timing for forming an image for each of the colors of Bk, C, M and Y in a case where the copying machine 101 is of a type in which image formation is performed, when a color image is to be printed, for each of the colors of Bk, C, M, and Y and then one color image is printed. As a result, the timing generating section 405 in the memory board 102 controls the timing for reading out the BkCMY data from the image memory 403 according to the set output timing so as to enable synchronizing to timing for forming an image for each of the colors of Bk, C, M, and Y in the copying machine 101 (Refer to FIG. 11A). In other words, image data is read out for each of the colors of Bk, C, M, and Y at intervals of a delay time corresponding to a distance between photoconductive drums each for forming an image for each of the colors (Refer to FIG. 11B).

Figure 11A:
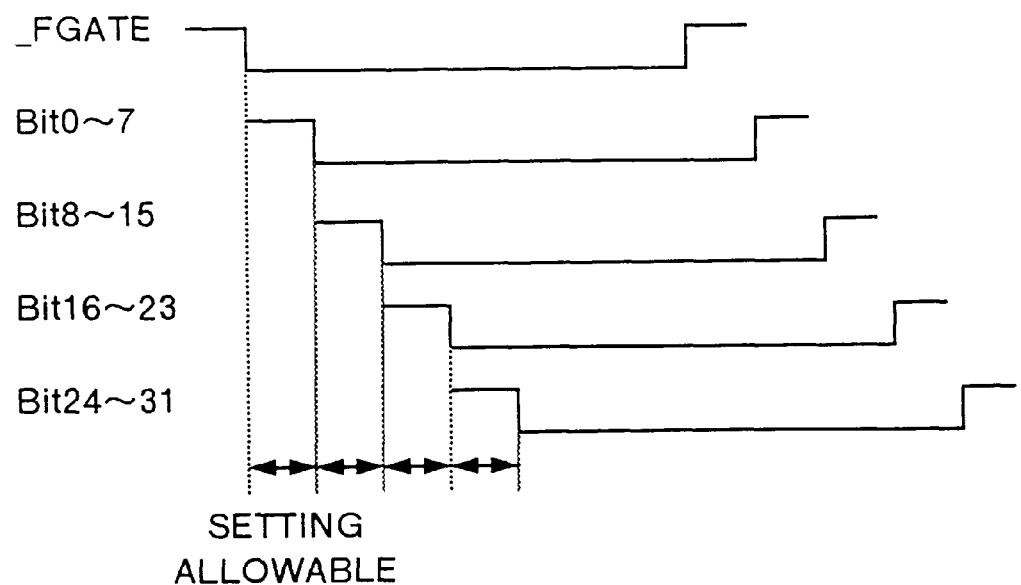
FIG. 11A is a timing chart for a case where BkCMY data is read out from the image memory with timing for forming images for each of the colors of Bk, C, M, and Y in the image processing system according to the embodiment of the present invention.
Figure 11B:
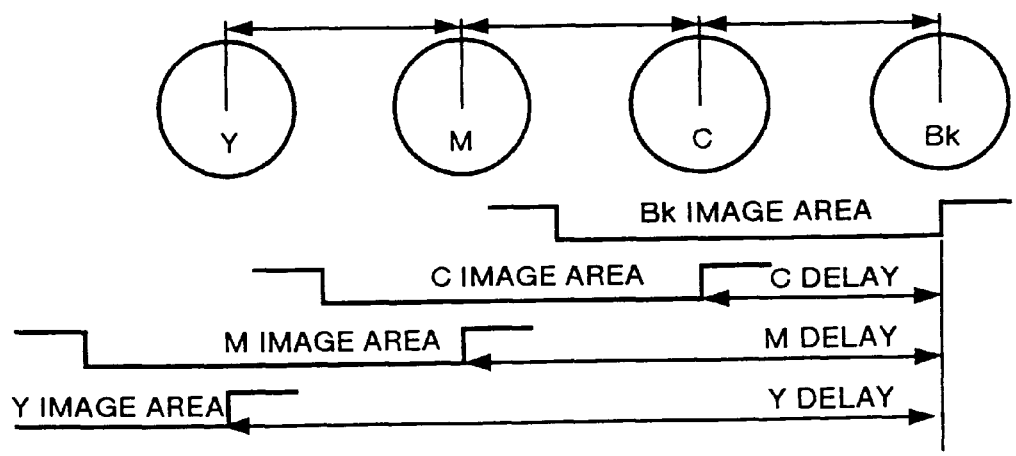
FIG. 11B is an explanatory view showing correlation between a photo-conductive drum for forming each image for each of the colors of Bk, C, M, and Y and a timing for outputting image data for each of the colors thereof in the image processing system according to the embodiment of the present invention.

It should be noted that FIG. 11A shows a timing chart when BkCMY data is read out from the image memory 403 with timing for forming an image for each of the colors of Bk, C, M, and Y, and FIG. 11B is an explanatory view showing correlation between the photo-conductive drums each for forming an image for each of the colors of Bk, C, M, and Y and timing for outputting image data for each of the colors thereof.

The copying machine 101 receives the BkCMY data read out via the BkCMY signal lines 320 shown in FIG. 3, and executes the processing for printing the color image onto recording paper (S509). It should be noted that, in step S506, when execution of any of the character mode, picture mode, and character mode/picture mode is specified, the printing processing is performed in the corresponding mode.

It is to be noted that, although the case where the RGB data is color-converted to BkCMY data in the computer 100 was described in relation to the embodiment above, the case where the RGB data is color-converted to BkCMY data in the copying machine 101 is also executed in the same manner as described above. Namely, RGB data is read out from the image memory 403 by 8 bits for each of the colors of R, G, and B, or each of 8-bit image data for R, G, and B is simultaneously read out by 24 bits to be received through the RGB signal lines 319, and the processing for converting the received data to BkCMY data or the printing processing is executed. Also, when conversion from RGB data to BkCMY data is to be performed by the copying machine 101, as the RGB data passes through the color correcting/character separating section 307, the printing processing can be executed in the first mode in which any edge in the RGB data is detected to separate the character area from the data, character mode is used for the data in the character area separated as described above and the picture mode is used for the data in other areas.

When image data is transmitted and received using the data for R, G, and B between the copying machine 101 and the computer 100, the processing for color-conversion from RGB to BkCMY is performed in the copying machine 101, and for this reason, images (color tone or the like) between an image obtained by simply copying the image data by the copying machine 101 and outputting the copied data onto recording paper and an image obtained by outputting the image data from the computer 100 onto recording paper are completely identical to each other, which is advantageous.

Further, the image data may be transmitted and received between the copying machine 101 and the computer 100 using BkCMY data after RGB data is previously color-converted to the BkCMY data by the copying machine 101.

As described above, with the image processing system and the image processing method according to the embodiment, image data can be transmitted by connecting an image data bus of a copying machine to an internal bus of a computer via the memory board 102 without using a printer controller as well as a universal communication cable, and by writing and reading image data in and from the image memory 403 in the memory board 102 each executed from both of the buses, which allows higher speed transfer of image data. Also, each of image data for three colors of R, G, and B is simultaneously read out and is also simultaneously written in the image memory 403, which makes it possible to transfer the image data at a further higher speed.

Image data transfer at a higher speed realized by the present invention allows the image data with high quality to be read out and to be printed, and further moire generated when any printed matter is read out can be removed, which makes it possible to obtain image data with further higher quality.

Further, an image processing system using existing apparatuses such as a copying machine 101 and a computer 100 can be constructed simply by replacing the printer controller with the memory board 102, so that costs of the system itself can be reduced.

Next description is made for a particular example of using the image processing system according to the embodiment. Herein, the image processing system according to the embodiment is used as a post card printing system so that data for a plurality of sheets of post card can be printed on one sheet of post card form.

Figure 12:
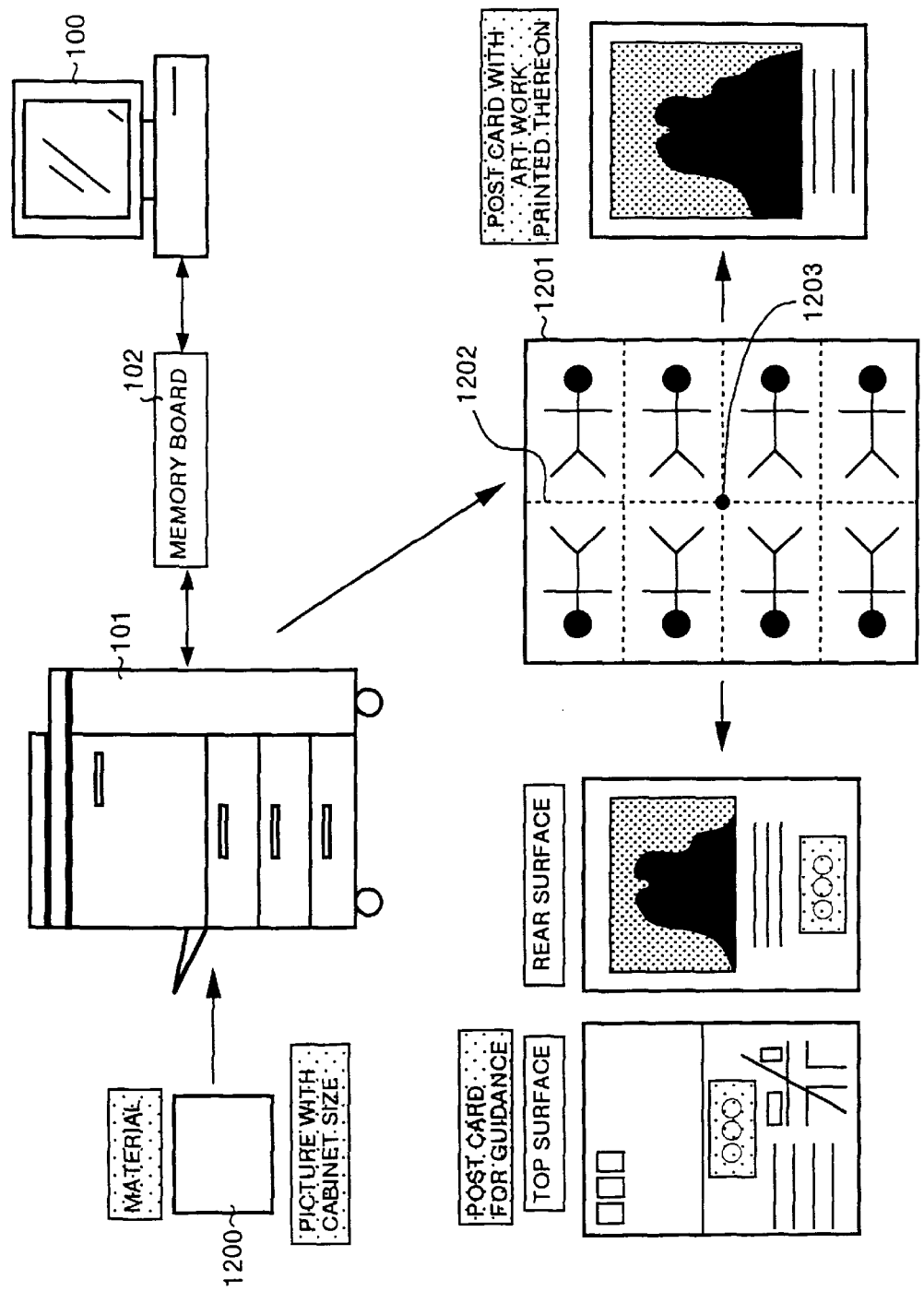
FIG. 12 is an explanatory view for explaining a flow from preparation of data for a post card to completion of a post card in a post card printing system using the image processing system according to the embodiment of the present invention.
Figure 13:
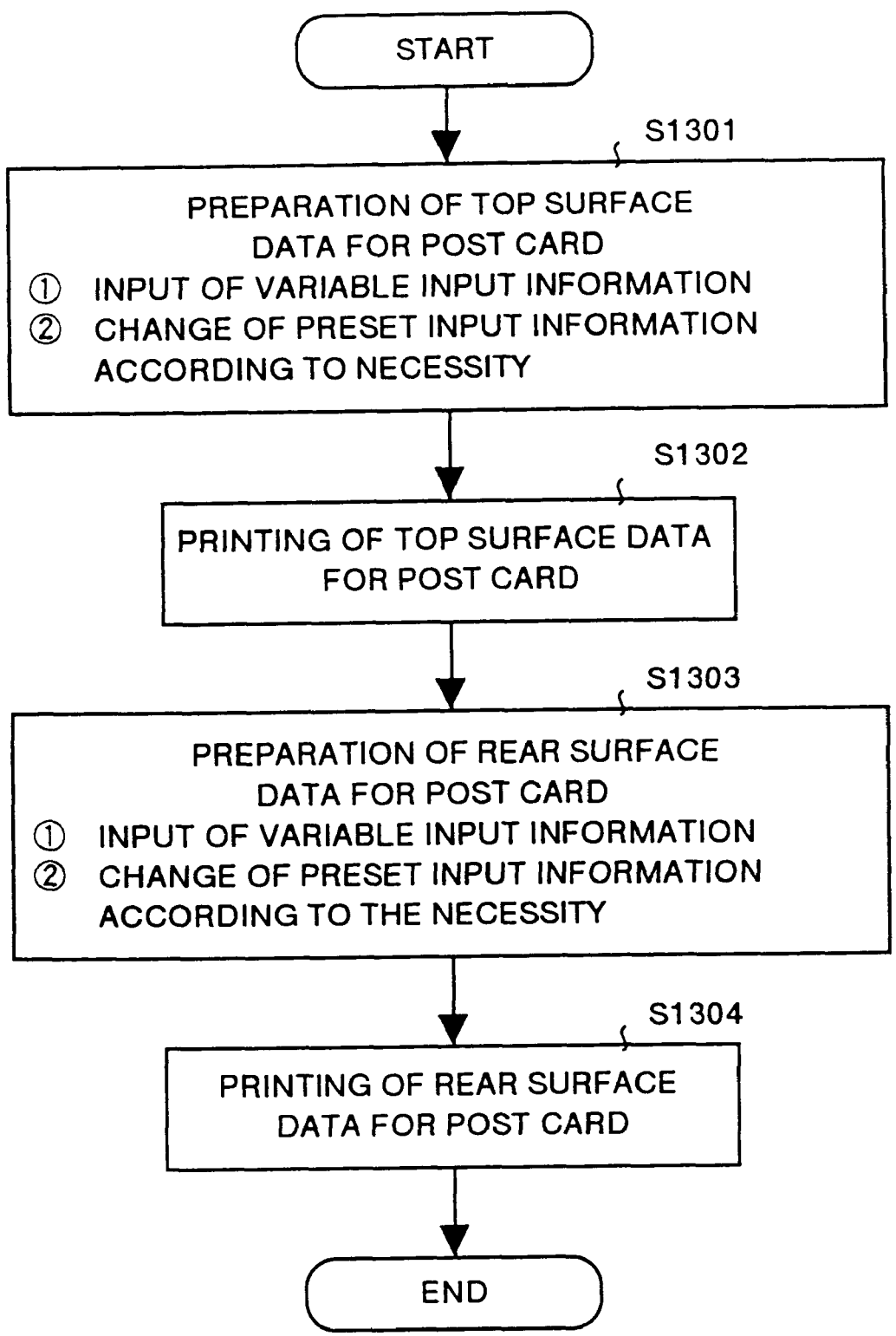
FIG. 13 is a flowchart for schematically explaining a method of preparing data for a post card and a method of printing a post card in the post card printing system using the image processing system according to the embodiment of the present invention.

Then, description is made for a post card printing system and a post card printing method using the image processing system by describing operations for preparing of an information card for an art exhibition or the like used as an example with reference to FIG. 12 and FIG. 13. FIG. 12 is an explanatory view for explaining a flow of steps from preparation of data for a post card to completion thereof, and FIG. 13 is a schematic flowchart of the steps.

In the post card printing system using the image processing system according to the embodiment, a card is completed by at first initiating software 207 for preparing eight sheets of a post card on a form, then preparing top surface data for a post card after a layout for printing a post card is selected (S1301), copying a plurality of sheets of the prepared top surface data, locating the copied data at symmetrical positions around a central point of the post card form 1201, and then printing the top surface data for the post card on one surface of a manually fed post card form 1201 (S1302), further, preparing rear surface data for the post card (1303), copying a plurality of sheets of the prepared rear surface data for the post card, locating the copied data at symmetrical positions around a central point of the post card form 1201, and then printing the rear surface data for the post card on the other surface of the post card form 1201 manually fed again (S1304)

It should be noted that the description assumes hereinafter that a person who is a sponsor of the exhibition and also an owner of the place for the exhibition is regarded as a user of the post card printing system, and that an information post card for the exhibition is prepared by printing data for eight sheets of post card on one sheet of post card form 1201. The post card form 1201 used herein has a size on which eight sheets of post cards are located, and is formed with perforations 1202 thereon along which the form can easily be divided into the eight sheets of post cards. It should be noted that the size of the post card form 1201 is not limited to the size thereof on which the eight sheets of post cards are located, and any size of the form on which an even number of sheets of post cards can be located may be used. If the post card form 1201 has a size on which an even number of sheets are located, the top surface data and the rear surface data for a post card can be located at symmetrical positions thereon, so that, even if the printing is performed with manually fed paper, the necessity for the user to check a direction of a post card form to be fed for matching printing directions between both of the data can be eliminated.

(1) Preparation of Top Surface Data for a Post Card (S1301)

At first, description is made for a method of preparing top surface data for a post card. It should be noted that the top surface data for a post card is defined herein as data printed on a surface of the post card on which a mailing address is to be printed (top surface). The user initiates the software 207 for preparing eight sheets of post cards on a form provided in the computer 100, according to inquiries provided by the initiated software 207 for preparing eight sheets of post cards on a form, selects a desired layout for printing a post card among a plurality of layouts for printing a post card, inputs desired character data in an area for character data set on the selected layout for printing a post card, and inputs desired image data in an area for image data to prepare top surface data for the post card. As the image data described above, image data for silver-salt photographs and films (positive or negative) or the like read by a copying machine 101, image data photographed by a digital camera described later, image data received through a communication line, image data recorded in a floppy disk or the like or some other data can be used.

FIG. 14 is an explanatory view showing one example of a setting screen used for preparation of top surface data for a post card. This setting screen has been prepared assuming that a user who is a sponsor of the exhibition as well as an owner of the place for the exhibition prepares an information post card. The setting screen shown in FIG. 14 can freely be customized according to any intended use by a user, so that the setting screen is not limited to the shown contents thereon.

The user inputs character data or image data according to the displayed entries on the setting screen shown in FIG. 14. The character data and image data to be inputted have two types of input information: 1) variable input information which is required to be inputted each time anew and 2) preset input information in which constant forms of available information have previously been set and data is changed only when the change is required. In FIG. 14, it is assumed that the two types of input information are previously specified such that information inputted into the entries 1 to 6 and 11 to 14 is the variable input information and information inputted into the entries 7 to 10 is the preset input information.

The user inputs variable input information by inputting character data through a keyboard according to the setting screen shown in FIG. 14, and making, for example, the copying machine 101 read out a photograph 1200 to input the image data from the image memory 403 in the memory board 102. In FIG. 14:

1. "Exhibition of Patents" is inputted as an exhibition title;
2. "Memorial exhibition of 100 years Anniversary of Birth of Tokkyo Taro" is inputted as a subtitle;
3. "A" is selected as a decorative pattern on a surface with an address on;
4. "9 (month)", "1 (date)", "Sunday (a day of the week)", "9 (month)", "22 (date)", and "Sunday (a day of the week)" are inputted as the date of exhibition;
5. "11 (o'clock)", "00 (minute)", "5 (o'clock)", and "00 (minute)" are inputted as the time of exhibition; and
6. "present" indicating that it is selected that a comment on time is attached to the above time is selected as a comment on time, and "4 (o'clock)" is inputted.

It should be noted that, on the setting screen, not only input of the character data and image data but also editing works such as setting of a color of a character, enlargement, reduction, and rotation of image data can be performed.

In FIG. 14, the information preset as preset input information is displayed in the entries such as a name of a place where the exhibition is held, an address of the place, a telephone number of the place, and a map for the place. Accordingly, the preset input information is used as it is excluding in a case where some of the preset input information is required to be changed.

Figure 15:
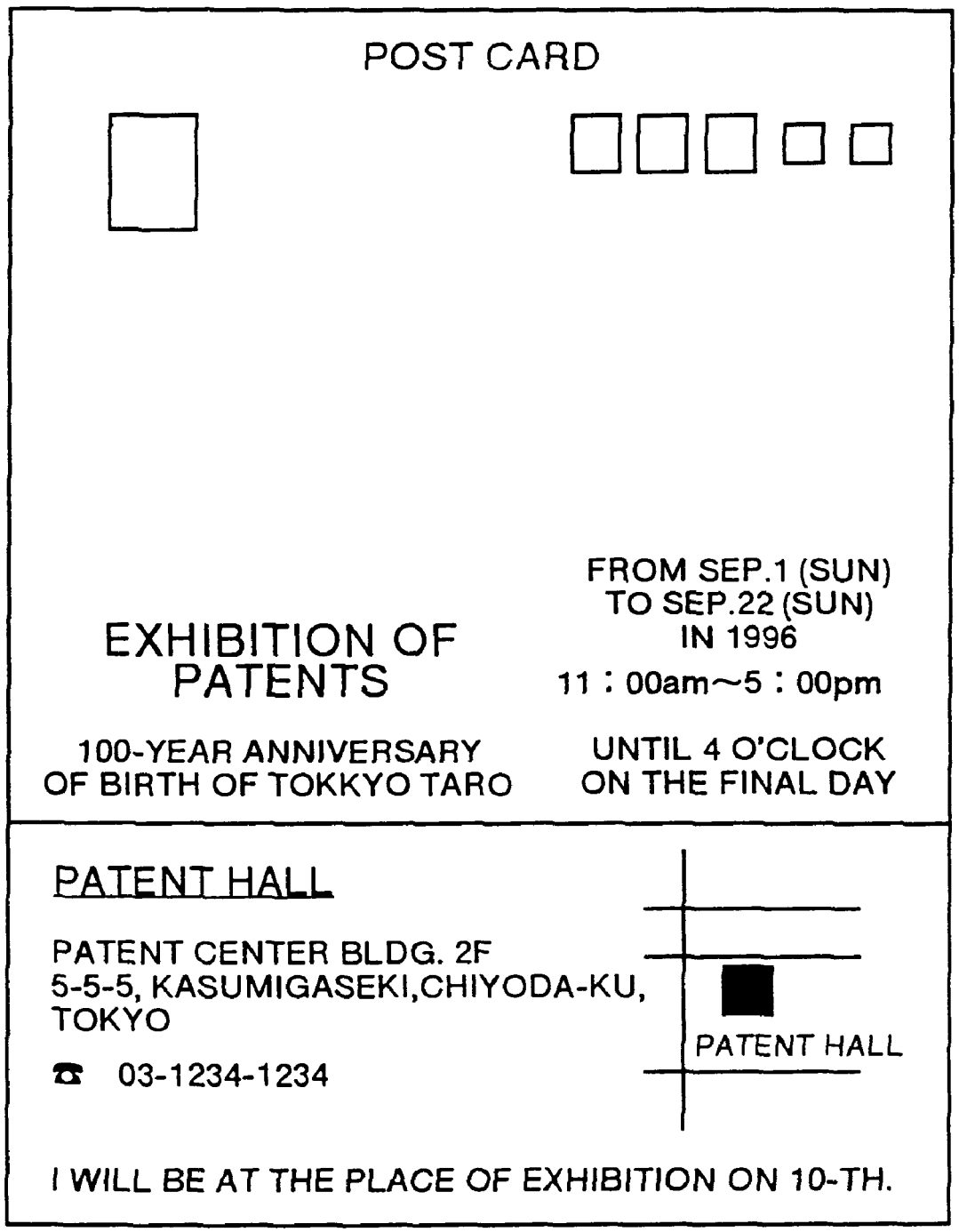
FIG. 15 is an explanatory view showing an example of top surface data for a post card prepared by inputting character data and image data according to the setting screen shown in FIG. 14.
Figure 16:
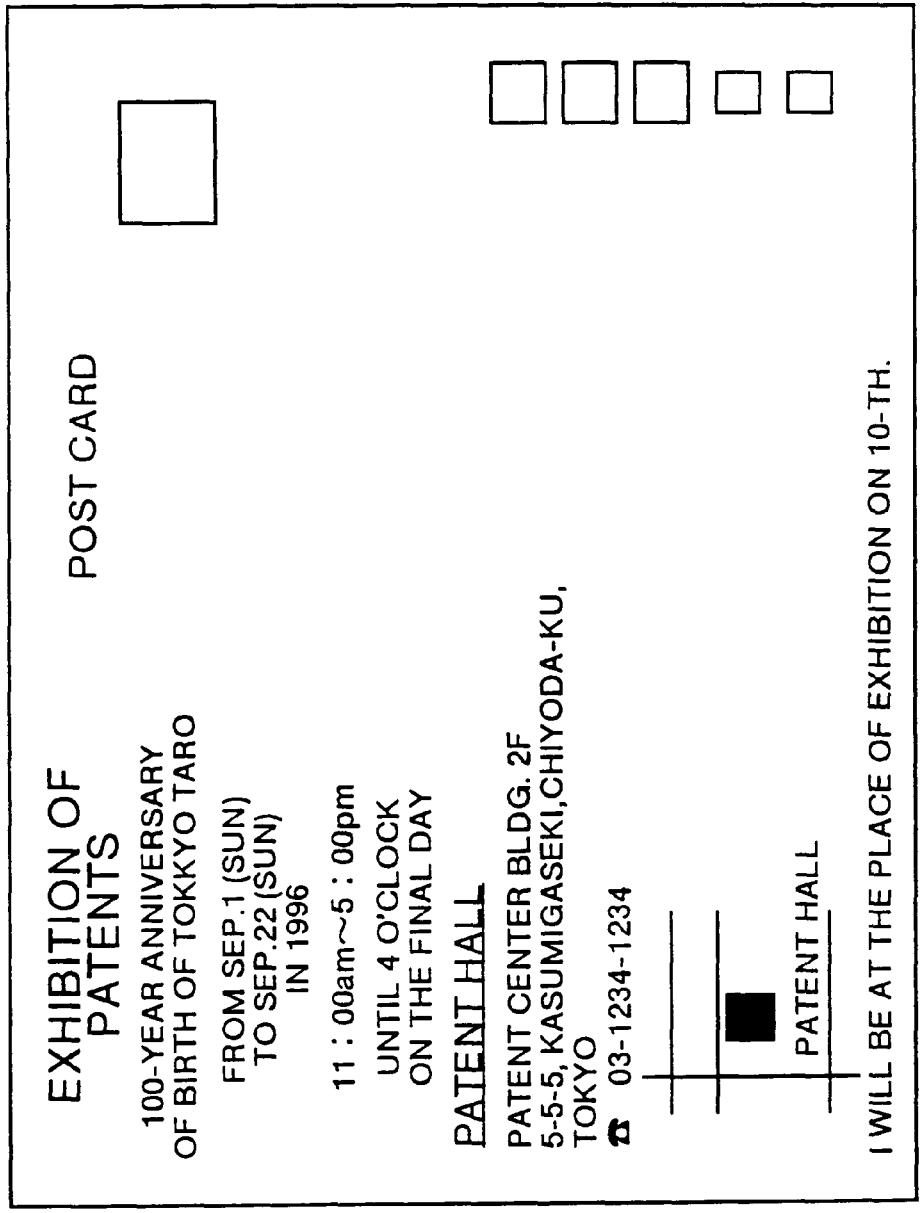
FIG. 16 is an explanatory view showing an example of top surface data for a post card prepared by inputting character data and image data according to the setting screen shown in FIG. 14.

FIG. 15 and FIG. 16 are explanatory views each showing an example of the top surface data for a post card prepared by inputting the character data as well as image data into the entries according to the setting screen shown in FIG. 14. FIG. 15 shows a case where a post card is put in the portrait orientation for printing, and FIG. 16 shows a case where the post card is put in the landscape orientation. As described above, the character data and image data to be inputted have two types of variable input information and preset input information provided therein, so that only the information that is necessary to be inputted may be inputted, and information that is not necessary to be changed can be used as it is. Accordingly, a volume of information to be inputted can be reduced and a top surface data can be prepared quite easily.

(2) Printing of Top Surface Data for a Post Card (S1302)

Next description is made for the method of printing top surface data for a post card. The top surface data for a post card prepared as described above is written into the image memory 403 in the memory board 102 from the computer 100. When the top surface data for a post card is to be written into the image memory 403, the data for one sheet of post card is changed to that for eight sheets thereof by copying the top surface data for a post card. Then, the top surface data for eight sheets of post cards obtained by copying the data for one sheet of post card as far as data for eight sheets thereof is developed inside the image memory 403 so as to be located at symmetrical positions around a central point 1203 of the post card form 1201 (Refer to FIG. 12).

Figure 17A:
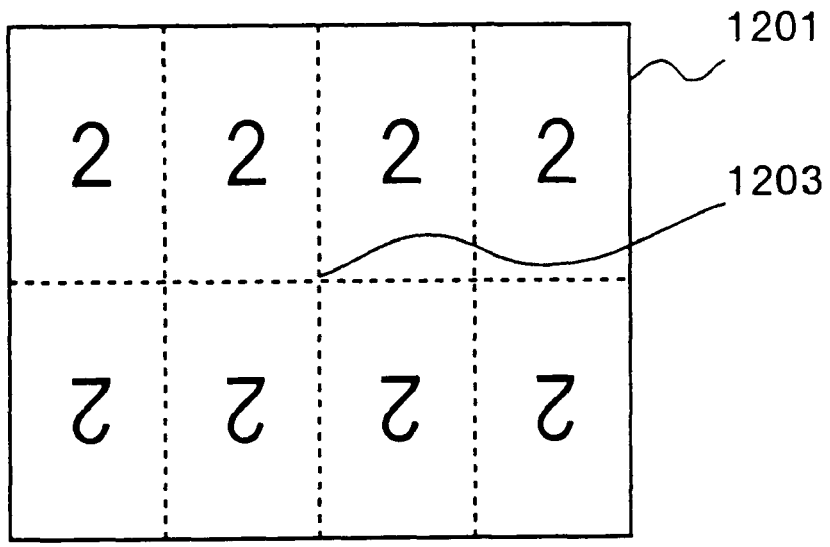
FIGS. 17A and FIG. 17B are explanatory views each showing an example of which top surface data for a post card is developed so as to be at symmetrical positions around a central point of the post card form in the post card printing system using the image processing system according to the embodiment of the present invention.
Figure 17B:
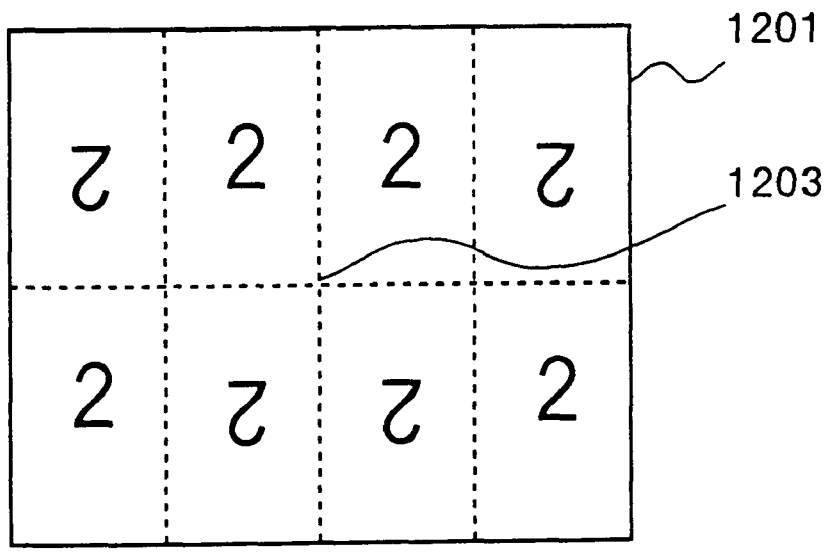

FIG. 17A and FIG. 17B are explanatory views each showing an example of the copied top surface data for post cards developed as described above so as to be placed at symmetrical positions around a central point 1203 of the post card form 1201. As shown in FIG. 17A and FIG. 17B, each orientation of the top surface data for post cards to be developed may not be in the same direction, so that the top surface data for eight sheets of post cards may be located at symmetrical positions around a central point 1203 of the post card form 1201. The top surface data for eight sheets of post cards is developed on the form as described above so as to be located at symmetrical positions around a central point 1203 of the post card form 1201, and the data kept in the above state is printed on one surface of the post card form 1201, so, when rear surface data for post cards described later is to be printed on the other surface of the post card form 1201, it is not necessary to check a direction of the post card form to be fed.

The top surface for post cards developed so as to be at symmetrical positions around a central point of the post card form 1201, is read out from the image memory 403 in the memory board 102 to the copying machine 101. As the post card form 1201 on which the top surface data for post cards is printed is generally thicker than recording paper used for the copying machine 101, the forms are manually fed into the copying machine 101. The post card form 1201 is manually fed into the copying machine 101 as described above, and the top surface data for post cards is printed on one surface of the fed post card form 1201.

(3) Preparation of Rear Surface Data for a Post Card (S1303)

Description is made for a method of preparing rear surface data for a post card. It should be noted that the rear surface data for a post card herein indicates data which is printed on a surface (rear surface) opposite to the top surface of a post card on which a mailing address is to be printed, and which also includes image data or the like for works to be exhibited in an exhibition.

The rear surface data for a post card is prepared, as in a case where the top surface data for a post card is prepared, according to the setting screen as shown in FIG. 14. Although detailed description on preparation of rear surface data for a post card is omitted herein, it is assumed herein that character data such as a name of an exhibition, a title of a work, a size thereof, and a name of the creator is inputted, and image data read by a copying machine 101 such as a photo 1200 of the work is also inputted to prepare the rear surface data for a post card to introduce works exhibited in the exhibition (Refer to FIG. 12).

(4) Printing of Rear Surface Data for a Post Card (S1304)

The rear surface data for a post card prepared as described above is written into the image memory 403 in the memory board 102 from the computer 100 as in a case of the top surface data for a post card, and the data for one sheet of post card is changed to that for eight sheets thereof obtained by copying the rear surface data for a post card. Then, the rear surface data for eight sheets of post cards obtained by copying the data for one sheet of post card as far as data for eight sheets thereof is developed inside the image memory 403 so as to be located at symmetrical positions around a central point of the post card form 1201 (Refer to FIG. 17A and FIG. 17B).

Then the rear surface data for post cards developed so as to be at symmetrical positions around a central point of the post card form 1201 is read out from the image memory 403 to the copying machine 101. Then, the post card form 1201 with the top surface data printed on one surface thereof is turned over and manually fed again to the copying machine 101, and the rear surface data for post cards is printed on the other surface of the post card form 1201. As described above, the top surface data and the rear surface data for post cards are located so as to be at symmetrical positions around a central point 1203 of the post card form 1201, so that, even if the printing is performed with manually fed forms, the necessity for the user to check a direction of a post card form to be fed for matching printing directions on both surfaces of the post card can be eliminated. Namely, when rear surface data is printed on a post card form with top surface data printed thereon, a printing direction and a printing position of the top surface data for post cards on the form matches with those of the rear surface data for post cards even if the post card form is fed into the copying machine 101 for printing without checking the printing direction thereof.

After the top and rear surface data for post cards are printed on the post card form 1201 as described above, eight sheets of post cards can be prepared out of one sheet of post card form by dividing the post card form 1201 along the perforations 1202.

As described above, with the post card printing system and the post card printing method using the image processing system according to the embodiment of the present invention, a post card printing system can be constructed using the image processing system, which allows the printing processing at a higher speed because of image data transfer at a higher speed.

Also, with the image processing system, reading and printing of image data with high quality can be performed, and moire generated when a printed matter is read out can be removed, which allows a color image with high quality to be printed on a post card.

A post card printing system can be constructed using the image processing system, which allows cost reduction of the post card printing system to be achieved.

Two types of variable input information and preset input information are provided in character data and image data to be inputted, which allows reduction of a volume of input information and top surface data for a post card can be prepared quite easily. Namely, only the information required to be inputted may be inputted, so that information which is not required to be changed can be used as it is.

Further, the top surface data for post cards is developed so as to be at symmetrical positions around a central point 1203 of the post card form 1201, and the data kept in the above state is printed on one surface of the post card form 1201, so, when rear surface data for post cards is to be printed on the other surface of the post card form 1201, the necessity of checking a direction of the post card form to be fed can be eliminated.

It should be noted that, in FIG. 13, a post card is prepared in the order of the preparation of top surface data for a post card (S1301), printing thereof (S1302), preparation of rear surface data for a post card (S1303), and printing thereof (S1304), an order of preparation and printing of data for a post card is not limited to the above order. Also, top surface data and rear surface data for post cards obtained by copying each data as far as data for eight sheets thereof respectively may be kept for printing the top surface data and rear surface data for post cards on a plurality of sheets of post card form 1201.

As an example of using the image processing system according to the embodiment, preparation of an information post card for an art exhibition or the like has been explained with reference to the post card printing system, but the image processing system according to the embodiment of the present invention can also be used for a number of other purposes.

Figure 18:
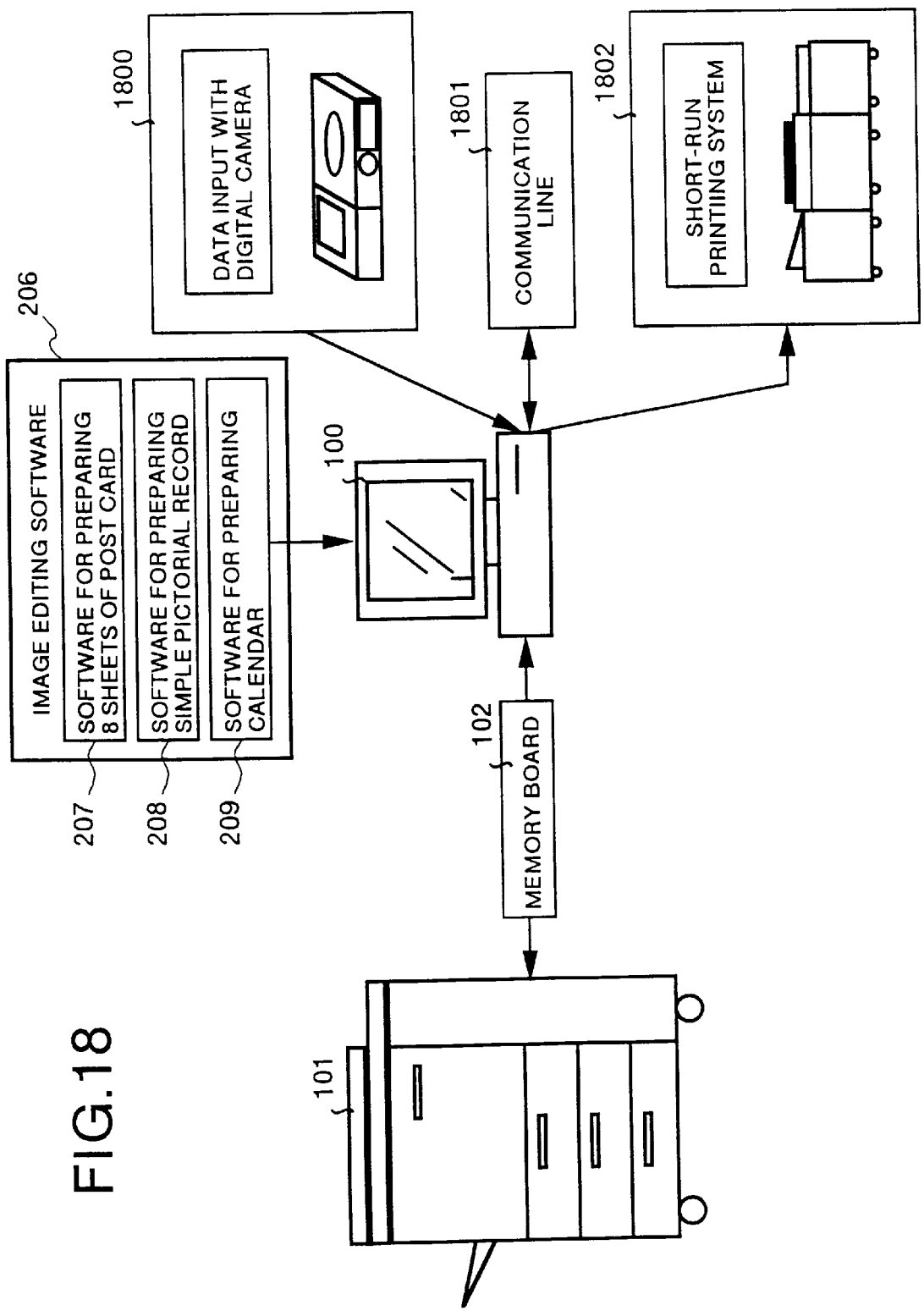
FIG. 18 is an explanatory view for explaining an example of other usage of the image processing system according to the embodiment of the present invention.

FIG. 18 is an explanatory view for explaining another example of using the image processing system according to the embodiment. As shown in FIG. 18, in the image processing system according to the embodiment, image data read by a copying machine 101 can be used, and in addition, image data photographed by a digital camera 1800 and image data inputted through a communication line 1801 can also be used. Also, the processing for printing image data can be performed not only by a copying machine 101, but also by using a short-run printing system 1802. A particular example of the usage is described below.

(1) Creation of a Post Card with an Art Work Thereon (a Pictorial Card)

A post card with an art work thereon (a pictorial card) can be created. A surface for a mailing address to be printed thereon is printed on one surface of a post card form using the method described above, and image data for an art work such as a picture or the like is printed on the other surface thereof, so that a post card for introducing a work or a pictorial card can be created (Refer to FIG. 12).

(2) Preparation of a Pictorial Record

A plurality of image data and character data are inputted and data for printing a pictorial record obtained by arranging works such as a plurality of pictures on one sheet of form can be prepared by using the software 208 for preparing a simple pictorial record in the image editing software 206 provided in the computer 100. Then, the data for printing a pictorial record prepared by the computer 100 using, for example, the short-run printing system 105 shown in FIG. 18 is printed on the form and the pictorial record can be prepared.

(3) Preparation of a Calendar

A calendar can be prepared using image data such as a picture or the like by using the software 209 for preparing a calendar in the image editing software 206 provided in the computer 100.

(4) Preparation of a Replica of a Work

A replica of a work can easily be prepared by feeding specific paper as a canvas into the copying machine 101 and printing image data for a picture edited by the computer 100 on the paper.

(5) Opening of Works to the Public on a Network

Further, works can be opened to the public on the Internet or a commercial net or the like by inputting image data for works such as pictures or the like and outputting the edited image data using a communication line.

Figure 19:
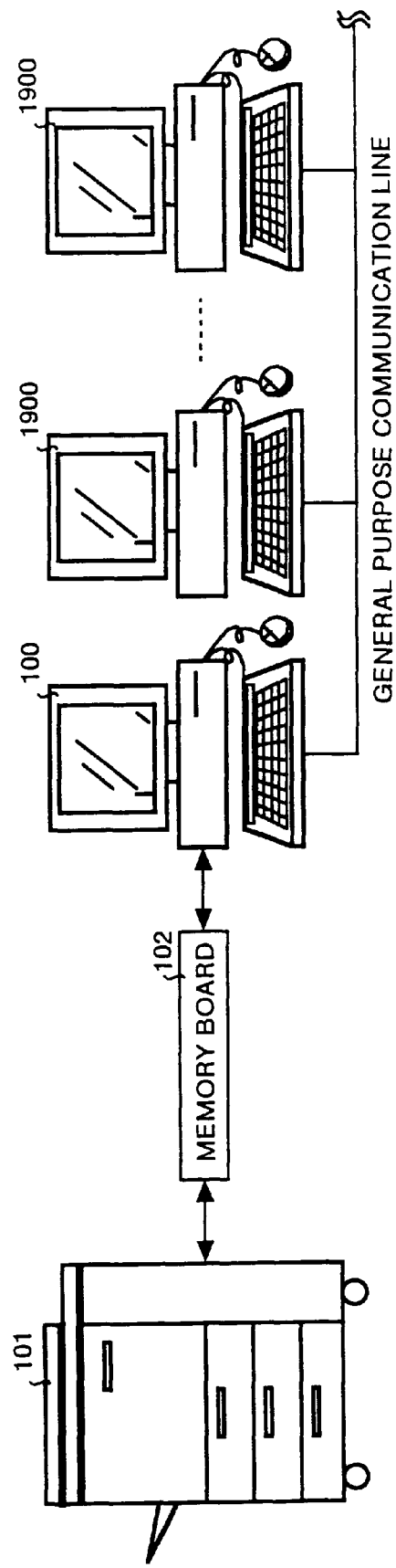
FIG. 19 is an explanatory view showing how a network is constructed with a plurality units of computer connected to each other in the image processing system according to the embodiment of the present invention.

As shown in FIG. 19, a plurality of computers 1900 can also be connected to the computer 100 of the image processing system according to the embodiment through a general-purpose communication line, and a network in which one unit of copying machine 101 is shared with a plurality of computers can also be constructed.

Further, the post card printing method and the method of preparing data for a post card each described in the embodiment is realized by executing a pre-prepared program (image editing software 206, reading/printing control software 210 or the like) by any computer such as a personal computer or a work station. This program is executed by being recorded in a computer readable recording medium such as a hard disk, a floppy disk, a CD-ROM, an MO, and a DVD, and being read out from the recording medium by the computer. This program can also be distributed through the recording medium or any of networks.

As described above, the image processing system according to the present invention comprises a reader for simultaneously reading image data for three colors of R, G, and B from a document to be read; an editor for editing the image data read by the reader; a printer for printing the image data edited by the editor; and a storage device having a memory for storing therein the image data, to which internal buses of the reader, editor and printer are connected respectively via the memory so that the image data can be transferred via the memory; and in the image processing system the reader executes the processing for reading image data for three colors of R, G, and B from the document and simultaneously writing the read image data for three colors of R, G, and B in discrete regions for the three colors respectively in the memory; the editor executes the processing for reading out image data written by the reader from the memory, editing the image data, and writing the edited image data in the memory again; the printer executes the processing for reading out the image data written by the editor from the memory and printing the image data; and the storage device controls the processing for writing the image data by the reader and the processing for reading out the image data by the printer, so that image data can be transferred at a high speed. Further image data for three colors of R, G, and B can simultaneously be read and written in the memory, so that image data can be transferred at a further higher speed. In addition, as image data can be transferred at a high speed, it becomes possible to read and print high quality image data. Namely, it is not necessary to execute image data transfer via a general purpose communication line with a printer controller, so that image data can be transferred at a high speed.

With the image processing system according to the present invention, the editor specifies at least size and resolution of the document to be read and execution of the processing for reading image data thereof to the reader and also sets an address for writing the image data read by the reader in the memory according to the size and resolution of the document specified above; the reader reads, when execution of the processing for reading image data is specified by the editor, image data from the document in synchronism to a synchronizing signal comprising a vertical synchronizing signal, a horizontal synchronizing signal, and a clock signal according to the specified size and resolution of the document and writes the image data read as described above in the memory; and the storage device receives the image data and synchronizing signal from the reader, controls the processing for writing by the reader according to the received synchronizing signal, and writes the image data at the address set by the editor, so that image data can be read according to the right sequence when the editor reads out the image data.

With the image processing system according to the present invention, the editor reads out image data having been written in the memory according to the set address, edits the image data, and then sets an address for writing the image data in the memory according to the edited image data, and writes the edited image data in the memory, so that the image data written by the reader can be read out according to the right sequence, and further the image data can be transferred to the printer according to the right sequence by reading the image data with the printer according to addresses where the edited image data is written.

With the image processing system according to the present invention, the editor specifies execution of the processing for printing the edited image data to the printer; the printer generates, when execution of the processing for printing is specified by the editor, a synchronizing signal comprising a vertical synchronizing signal, a horizontal synchronizing signal, and a clock signal, and executes the processing for reading out the image data from the memory in synchronism to the generated synchronizing signal; and the storage device receives the synchronizing signal from the printer, controls the processing for reading out image data by the printer according to the received synchronizing signal, and reads out the image data from the address set by the editor in synchronism to the synchronizing signal, so that the printer can read out the image data according to the addresses where the edited image data is written and also the image data can be printed according to the right sequence.

With the image processing system according to the present invention, the reader can subject the image data read from the document to at least a smoothing processing and/or a moire removing processing; and the editor can specify, when specifying execution of the processing for reading the image data, execution of the smoothing processing and/or the moire removing processing, so that high quality image data can be obtained.

With the image processing system according to the present invention, the printer can execute printing, when the image data is to be printed, in any of a character mode in which printing is executed with the weight placed on expression of characters a picture mode in which printing is executed with the weight placed on expression of the picture, a first character/picture mode in which the character area is separated from the image data, the character mode is used for the character area, and the picture mode is used for other areas in printing, and a second character/picture mode in which the character mode or picture mode is specified for each color of the image data for printing; and the editor can specify, when execution of the processing for printing is to be specified, any one of the character mode, picture mode, and first and second character/picture modes, so that a user can select the print mode suited to his/her desire from the editor side, which enables improvement of convenience in operation.

With the image processing system according to the present invention, the editor can specify a reading range of the image data to the reader; and the reader can read image data from the document according to the reading range specified by the editor, so that a volume of image data can be reduced and also image data can be transferred at a high speed. In addition, as a range for reading can be specified from the editor side, convenience in operation can be improved.

With the image processing system according to the present invention, the editor can specify a position for printing the image data; and the storage device controls timing for reading out image data from the memory with the printer according to the printing position specified by the editor, so that an image can be printed at a desired position on recording paper. Also as a printing position can be specified from the editor side, convenience in operation can be improved.

With the image processing system according to the present invention, the editor can set the timing for outputting image data for each of the colors according to timing for forming an image for each color in a case where the printer is of a type in which image formation is performed, when a color image is to be printed, for each of the colors of the color image and then one color image is printed; and the storage device controls the processing for reading out image data from the memory by the printer according to the timing for output set by the editor, so that any type of printer can be connected to the editor to form an image processing system.

With the image processing system according to the present invention, the editor can have a given number of other editors connected thereto and also can form a network in which image data can be read out and printed by using the reader and the printer through the editor, so that a printer controller is not required for forming a network and a network can be formed with low cost.

With the image processing system according to the present invention, the reader and the printer form a digital color copying machine; the editor is a computer having an application program for editing images stored therein; and the storage device is a memory board having a memory for storing images therein and an interface connecting an image data bus of the copying machine and an internal bus of the computer to the memory for images so that image data can be written in from the copying machine or the computer or read out from the memory for images, and for this reason an image processing system comprising a copying machine or a computer can be built by only adding a memory board in place of a printer controller, which makes it possible to utilize the existing facilities effectively.

With the post card printing system according to the present invention for preparing top surface data for a post card as well as rear surface data for the post card, printing the top surface data for a post card on one surface of a post card fed thereto and also printing the rear surface data for the post card on the other surface of the fed post card by using the image processing system according to the present invention, and in the post card printing system the post card has a size in which an even number of post cards are arrayed; the editor prepares top surface data for the post card as well as rear surface data for the post card, writes the prepared top surface data for the post card in a memory of the storage device and copies the data by a plurality of sheets, locates the copied data at symmetrical positions around a central point of the post card form, also writes the prepared rear surface data for the post cards in the memory and copies the data by a plurality of sheets, and locates the copied data at symmetrical positions around a central position of the post card; the printer reads out the top surface data for the post card copied by the editor from the memory, prints the top surface data for the post card on one surface of the fed post card, reads out the rear surface data for the post card copied by the editor from the memory, and prints the rear surface data of the post card on another surface of the fed post card again, so that, in addition to the effects provided by the image processing system, there is provided the effect that the necessity for checking a feeding direction of a post card form for coincidence of printing directions on both top and rear surfaces of the form can be eliminated. Namely, when data for a rear surface of a post card is to be printed on a post card form with data for a top surface thereof printed thereon, even if the post card form is fed without checking the printing direction, a printing direction and a printing position on the top surface of the post card matches those on a rear surface thereof. Also as a plurality sheets of post card can simultaneously be printed, the printing efficiency is improved, and a unit cost for a sheet of post card can be reduced.

With the post card printing system according to the present invention, the editor selects a desired layout for printing a post card form a plurality of layouts previously prepared for printing a post card, inputs desired character data in a character data area set on the selected layout for printing a post card, and prepares the top surface data for a post card as well as rear surface data for a post card by inputting desired image data into the image data area; the character data and image data have two types input information: variable input information which is required to be inputted each time anew and preset input information with constant forms of available information having been previously set therein; and the variable input information is inputted with the preset input information changed according to the necessity and the image data read with the reader is used as the image data when the character data and image data are inputted, so that a volume of information to be inputted can be reduced, and top surface data for a post card can be prepared quite easily. Namely, it is required only to input required information, and the information not required to be changed can be used as they are.

With the post card printing system according to the present invention, the post card has perforations along which the post card can be divided to an even number of sheets, so that a plurality of sheets of post card can easily be prepared from a sheet of post card form with data for a plurality of sheets of post card printed thereon.

With the image processing method according to the present invention in an image processing system comprising a reader for simultaneously reading image data for three colors of R, G, and B from a document to be read; an editor for editing the image data read by the reader; a printer for printing the image data edited by the editor; and a storage device having a memory to which internal buses of the reader, editor and printer are connected respectively via the memory so that the image data can be transferred via the memory; the image processing method comprises a reading step of reading image data for three colors of R, G, and B from the document with the reader and also simultaneously writing the read image data for each of the three colors of R, G, and B in the discrete areas for the three colors respectively in the memory; an editing step of reading the image data written in the reading step from the memory, editing the image data with the editor, and writing the edited image data again in the memory; and a printing step of reading the image data written in the editing step from the memory and printing the image data with the printer, so that image data can be transferred at a high speed. Further, image data for three colors of R, G, and B are simultaneously read and written in a memory, so that image data can be transferred at a further higher speed. Furthermore, as image data can be transferred at a higher speed, it becomes possible to read and print high quality image data. Namely, it is not necessary to transfer image data via a general purpose communication line between the image processing system and a printer controller, further higher speed in image data transfer can be realized.

With the image processing method according to the present invention, there are included a read execution specifying step of specifying, when image data is to be read in the reading step above, at least size, resolution of the document to be read and execution of the processing for reading image data thereof to be read to the reader; and an address setting step of setting an address for writing the image data read with the reader into the memory according to the size and resolution of the document specified in the read execution specifying step; and in the reading step, when execution of the processing for reading image data is specified in the read execution specifying step, image data is read from the document in synchronism to a synchronizing signal comprising a vertical synchronizing signal, a horizontal synchronizing signal, and a clock signal according to the specified size and resolution of the document, and the image data is written at the address set in the address setting step according to the synchronizing signal, so that the image data can be read out according to the right sequence when the image data is read out by the editor.

With the image processing method according to the present invention, in the editing step, the image data having been written in the memory is read out according to the address set in the address setting step with the image data edited, then an address for writing the image data into the memory is set according to the edited image data, and the edited image data is written into the memory, so that image data written by the reader can be read out according to the right sequence, and also the image data can be transferred to a printer according to the right sequence because the printer reads out the image data according to addresses at which the edited image data is written.

With the image processing method according to the present invention, there are further included a print execution specifying step of specifying execution of printing the image data edited in the editing step to the printer, and in the printing step, when execution of printing is specified in the print execution specifying step, the image data is read out from the memory in synchronism to a synchronizing signal comprising a vertical synchronizing signal, a horizontal synchronizing signal, and a clock signal according to the address set in the editing step, so that the printer can read out the image data according to the addresses where the edited image data is written, and the image data can be printed according to the right sequence.

With the image processing method according to the present invention; the reading step includes a processing step of subjecting the image data read from the document to at least the smoothing processing and/or moire removing processing; and in the read execution specifying step, when execution of reading the image data is to be specified, execution of the smoothing processing and/or moire removing processing can be specified, so that higher image quality image data can be obtained.

With the image processing method according to the present invention, when the image data is to be printed in the printing step, printing can be executed in any of a character mode in which printing is executed with the weight placed on expression of characters, a picture mode in which printing is executed with the weight placed on expression of the picture, a first character/picture mode in which the character area is separated from the image data, the character mode is used for the character area, and the picture mode is used for other areas in printing, and a second character/picture mode in which the character mode or picture mode is specified for each color of the image data for printing; and in the print execution specifying step, any one of the character mode, picture mode, and first and second character/picture modes can be specified, so that the print mode suited to the user's desire can be specified from the editor side, which improves the convenience in operation.

With the image processing method according to the present invention, in the read execution specifying step, a range for reading the image data can be specified to the reader; and in the reading step, image data is read from the document according to the reading range specified in the read execution specifying step, so that a volume of image data can be reduced and the image data can be transferred at a higher speed. In addition, a reading range can be specified from the editor side, so that the convenience in operation can be improved.

With the image processing method according to the present invention, a position for printing the image data can be specified in the print execution specifying step, and the image data is read out, in the printing step, from the memory in synchronism to the synchronizing signal at the timing corresponding to the printing position specified in the print execution specifying step, so that the image can be printed at a desired position on recording paper. Also as a printing position can be specified from the editor side, the convenience in operation can be further improved.

With the image processing method according to the present invention, there is further included an output timing setting step of setting timing for outputting image data for each of the colors according to the timing for forming an image for each of the colors when the printer is of a type in which image formation is performed, when a color image is printed by the printer, for each color of the color image and then one color image is printed, and the image data is read out, in the printing step, from the memory according to the output timing set in the output timing setting step, so that any type of printer can be connected to the editor.

With the post card printing method according to the present invention, there is provided a post card printing method comprising the steps of preparing top surface data as well as rear surface data for a post card, printing the top surface data for a post card on one surface of a post card form, turning over the post card form, and printing the rear surface data for the post card on another surface of the post card manually fed thereto again by using the image processing method according to the present invention; and in this post card printing method the post card has a size in which an even number of post cards are arrayed; said method comprises a post card top surface data generating step of, by means of the editing step, preparing the top surface data for a post card, copying the prepared top surface data for the post card by a plurality of sheets by writing the prepared top surface data for the post card into a memory of the storage device, and also locating the copies symmetrically around a central point of the post card form; a post card top surface data printing step of, by means of the printing step, reading out the top surface data for a post card copied in the post card top surface data generating step from the memory and printing the top surface data for the post card on one surface of the post card form manually fed thereto; a post card rear surface data generating step, by means of the editing step, of preparing rear surface data for the post card, copying the prepared rear surface data by a plurality of sheets by writing the prepared rear surface data for the post card into the memory, and locating the copies symmetrically around a central point of the post card form; and a post card rear surface data printing step of, by means of the printing step, reading out the rear surface data for the post card copied in the post card rear surface generating step from the memory and printing the rear surface data for the post card on another surface of the post card form manually fed thereto again, so that, in addition to the effects provided by the image processing method described above, even in a case where printing is executed manually feeding paper, there is provided the effect that it is not necessary to check a post card form feeding direction so that a printing direction on a top surface thereof matches that on a rear surface thereof. Namely, when rear surface data for a post card is printed on a post card form with top surface data for it having been printed on the top surface, even if a post card form is fed without checking the printing direction, a printing direction and a printing position on the top surface of the post card matches those on the rear surface thereof. Also a plurality of sheets of post card can simultaneously be printed, so that the printing efficiency can be improved with a unit cost for a sheet of post card reduced.

With the post card printing system according to the present invention, wherein, in the post card top surface data generating step as well as in the post card rear surface data generating step, a desired layout for printing a post card is selected from a plurality of layouts for printing a post card previously prepared, desired character data is inputted into a character data area set in the selected layout for printing a post card, and also desired image data is inputted into an image data area for forming top surface data as well as rear surface data for the post card; the character data and image data have two types of input information; variable input information which is required to be inputted anew each time and preset input information with constant patterns of available information preset therein; and the variable input information is inputted with the preset input information changed according to the necessity and image data read in the reading step is used as the image data when the character data and the image data are to be inputted, so that a volume of inputted information can be reduced and top surface data for a post card can be prepared quite easily. Namely, it is required only to input required information, and information not required to be changed can be used as it is.

With the computer-readable recording medium according to the present invention, so that image data can be transferred at a high speed by making the computer execute this program, and also it becomes possible to read and print high quality image data.

With the computer-readable recording medium according to the present invention, there is stored a program making a computer execute each step in the post card printing method according to the present invention, so that, by making the computer execute this program, the necessity of checking a post card form feeding direction for matching a printing direction on the top surface to that on the rear surface thereof even in a case where printing is executed manually feeding paper.

This application is based on Japanese patent applications No. HEI 8-246673 and No. HEI 9-237442 filed in the Japanese Patent Office on Sep. 18, 1996 and Sep. 2, 1997, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teachings herein set forth.

What is claimed is:

1. A post card printing system for preparing top surface data for a post card as well as rear surface data for the post card, printing said top surface data for a post card on one surface of a post card fed thereto and also printing said rear surface data for post card on the other surface of said fed post card by using the image processing system comprising:

a reader for simultaneously reading image data for three colors of R, G, and B from a document to be read;

an editor for editing said image data read by said reader;

a printer for printing said image data edited by said editor; and a storage device having a memory for storing therein said image data, to which internal buses of said reader, editor and printer are connected respectively via said memory so that said image data can be transferred via said memory; wherein said reader executes the processing for reading image data for three colors of R, G, and B from said document and simultaneously writing said read image data for three colors of R, G, and B in discrete regions for the three colors respectively in said memory;

said editor executes the processing for reading out image data written by said reader from said memory, editing the image data, and writing said edited image data in said memory again;

said printer executes the processing for reading out said image data written by said editor from said memory and printing said image data; and said storage device controls the processing for writing said image data by said reader and the processing for reading out the image data by the printer; wherein said post card has a size in which an even number of post cards are arrayed;

said editor prepares top surface data for said post card as well as rear surface data for said post card, writes the prepared top surface data for said post card in a memory of said storage device and copies the data by a plurality of sheets, locates the copied data at symmetrical positions around a central point of the post card form, also writes the prepared rear surface data for the post cards in said memory and copies the data by a plurality of sheets, and locates the copied data at symmetrical positions around a central position of said post card;

said printer reads out the top surface data for post card copied by said editor from said memory, prints said top surface data for post card on one surface of said fed post card, reads out said rear surface data for post card copied by said editor from said memory, and prints said rear surface data of post card on another surface of said fed post card again.

2. A post card printing system according to claim 1; wherein said editor selects a desired layout for printing a post card form a plurality of layouts previously prepared for printing a post card, inputs desired character data in a character data area set on the selected layout for printing a post card, and prepares said top surface data for a post card as well as rear surface data for a post card by inputting desired image data into said image data area;

said character data and image data have two types input information: variable input information which is required to be inputted each time anew and preset input information with constant forms of available information having been previously set therein; and said variable input information is inputted with the preset input information changed according to the necessity and said image data read with said reader is used as said image data when said character data and image data are inputted.

3. A post card printing system according to claim 1; wherein said post card has perforations along which said post card can be divided to an even number of sheets.

4. A post card printing method comprising the steps of preparing top surface data as well as rear surface data for a post card, printing the top surface data for a post card on one surface of a post card form, turning over said post card form, and printing the rear surface data for the post card on another surface of the post card manually fed thereto again by using the image processing method in an image processing system comprising a reader for simultaneously reading image data for three colors of R, G, and B from a document to be read; an editor for editing said image data read by said reader; a printer for printing said image data edited by said editor; and a storage device having a memory to which internal buses of said reader, editor and printer are connected respectively via said memory so that said image data can be transferred via said memory; said image processing method comprising:

a reading step of reading image data for three colors of R, G, and B from said document with said reader and also simultaneously writing the read image data for each of the three colors of R, G, and B in the areas for said three colors respectively in said memory;

an editing step of reading said image data written in said reading step from said memory, editing the image data with said editor, and writing the edited image data again in said memory; and a printing step of reading the image data written in said editing step from said memory and printing said image data with said printer; wherein said post card has a size in which an even number of post cards are arrayed; said method comprising:

a post card top surface data generating step of, by means of said editing step, preparing said top surface data for post card, copying the prepared top surface data for the post card by a plurality of sheets by writing the prepared top surface data for the post card into a memory of said storage device, and also locating the copies symmetrically around a central point of the post card form;

a post card top surface data printing step of, by means of said printing step, reading out said top surface data for post card copied in said post card top surface data generating step from the memory and printing said top surface data for post card on one surface of the post card form manually fed thereto;

a post card rear surface data generating step of, by means of said editing step, preparing rear surface data for the post card, copying the prepared rear surface data by a plurality of sheets by writing the prepared rear surface data for the post card into said memory, and locating the copies symmetrically around a central point of the post card form; and a post card rear surface data printing step of, by means of said printing step, reading out the rear surface data for the post card copied in said post card rear surface generating step from the memory and printing said rear surface data for the post card on another surface of the post card form manually fed thereto again.

5. A post card printing system according to claim 4; wherein, in said post card top surface data generating step as well as in said post card rear surface data generating step, a desired layout for printing a post card is selected from a plurality of layouts for printing a post card previously prepared, desired character data is inputted into a character data area set in said selected layout for printing a post card, and also desired image data is inputted into an image data area for forming top surface data as well as rear surface data for the post card;

said character data and image data have two types of input information; variable input information which is required to be inputted anew each time and preset input information with constant patterns of available information preset therein; and said variable input information is inputted with said preset input information changed according to the necessity and image data read in said reading step is used as the image data when said character data and the image data are to be inputted.

6. A computer-readable recording medium with a program making a computer execute each step in the post card printing method according to claim 4 or claim 5 stored therein.

* * * * *